(12) United States Patent
Bhardwaj et al.

(10) Patent No.: US 11,714,573 B1
(45) Date of Patent: Aug. 1, 2023

(54) STORAGE OPTIMIZATION IN A DISTRIBUTED OBJECT STORE

(71) Applicant: Amazon Technologies, Inc., Seattle, WA (US)

(72) Inventors: Shashank Bhardwaj, Jersey City, NJ (US); Roman Gavrilov, Marlboro, NJ (US); Brian Scott Ross, Woodmere, NY (US); Mehul A. Shah, Saratoga, CA (US); Benjamin Sowell, San Mateo, CA (US); Anthony A. Virtuoso, Hawthorne, NJ (US); Linan Zheng, Jersey City, NJ (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/216,373

(22) Filed: Mar. 29, 2021

(51) Int. Cl.
*G06F 3/06* (2006.01)

(52) U.S. Cl.
CPC .......... *G06F 3/0659* (2013.01); *G06F 3/067* (2013.01); *G06F 3/0613* (2013.01); *G06F 3/0614* (2013.01); *G06F 3/0653* (2013.01)

(58) Field of Classification Search
CPC .... G06F 3/0613; G06F 3/0614; G06F 3/0653; G06F 3/0659; G06F 3/067; G06F 16/13; G06F 16/14; G06F 16/164; G06F 16/22; G06F 16/2282; G06F 16/31; G06F 16/901; G06F 16/988
USPC .................................................. 707/626–637
See application file for complete search history.

(56) References Cited

U.S. PATENT DOCUMENTS

| 5,642,503 | A | 6/1997 | Reiter |
| 5,701,480 | A | 12/1997 | Raz |
| 7,305,419 | B1 | 12/2007 | Cosby et al. |
| 7,827,144 | B1 | 11/2010 | Saito et al. |
| 10,466,924 | B1 * | 11/2019 | Newstadt ................ G06F 21/79 |
| 10,671,639 | B1 | 6/2020 | Acheson et al. |
| 10,860,550 | B1 | 12/2020 | Chheda et al. |
| 10,983,981 | B1 | 4/2021 | Sharma et al. |
| 11,061,652 | B1 | 7/2021 | Biswas et al. |
| 2003/0236786 | A1 | 12/2003 | Shi et al. |
| 2008/0228795 | A1 | 9/2008 | Lomet |
| 2009/0070330 | A1 | 3/2009 | Hwang et al. |
| 2012/0011106 | A1 | 1/2012 | Reid et al. |
| 2012/0209822 | A1 | 8/2012 | Prabhakar et al. |

(Continued)

OTHER PUBLICATIONS

Non-Final Office Action, U.S. Appl. No. 17/216,326, dated May 27, 2022, 20 pages.

(Continued)

*Primary Examiner* — Ilwoo Park
(74) *Attorney, Agent, or Firm* — Nicholson De Vos Webster & Elliott LLP

(57) ABSTRACT

Techniques for storage optimization in a distributed object store are described. A storage optimization service of a provider network monitors changes to data objects in a distributed object store that are part of a data lake and are referenced by a table index. The storage optimization service determines whether particular storage optimizations involving the data objects would be beneficial, prioritizes the ordering of these optimizations with a focus on performing impactful optimizations first, while intelligently scheduling the optimizations to avoid overutilization of available resources.

20 Claims, 12 Drawing Sheets

(56) References Cited

U.S. PATENT DOCUMENTS

| | | |
|---|---|---|
| 2012/0324472 A1 | 12/2012 | Rossbach et al. |
| 2013/0060742 A1 | 3/2013 | Chang et al. |
| 2013/0198435 A1* | 8/2013 | Sandadi ............... G06F 12/126 711/159 |
| 2014/0337393 A1 | 11/2014 | Burchall et al. |
| 2015/0378774 A1 | 12/2015 | Vermeulen |
| 2016/0283890 A1 | 9/2016 | Diehl |
| 2016/0314161 A1 | 10/2016 | Wen et al. |
| 2016/0371356 A1 | 12/2016 | Lee et al. |
| 2017/0300552 A1 | 10/2017 | Mandadi et al. |
| 2018/0322158 A1 | 11/2018 | Zhang et al. |
| 2018/0349430 A1 | 12/2018 | Lee et al. |
| 2019/0129893 A1 | 5/2019 | Baird et al. |
| 2020/0012619 A1* | 1/2020 | Gupta ................... G06F 16/907 |
| 2020/0073981 A1* | 3/2020 | Pilkington .......... G06F 16/2272 |
| 2020/0151166 A1 | 5/2020 | Shekhar et al. |
| 2020/0210519 A1 | 7/2020 | Wang et al. |
| 2021/0334258 A1 | 10/2021 | Ofenloch |

OTHER PUBLICATIONS

Non-Final Office Action, U.S. Appl. No. 17/216,359, dated Jun. 29, 2022, 20 pages.

Non-Final Office Action, U.S. Appl. No. 17/216,347, dated Sep. 29, 2022, 47 pages.

Notice of Allowance, U.S. Appl. No. 17/216,326, dated Nov. 7, 2022, 9 pages.

Notice of Allowance, U.S. Appl. No. 17/216,359, dated Feb. 28, 2023, 24 pages.

Non-Final Office Action, U.S. Appl. No. 17/216,347, dated May 26, 2023, 51 pages.

* cited by examiner

STORAGE OPTIMIZATION IN A DISTRIBUTED OBJECT STORE

BACKGROUND

As the technological capacity for organizations to create, track, and retain information continues to grow, a variety of different technologies for managing and storing the rising tide of information have been developed. Different storage systems, database systems, and other data processing platforms may provide clients with standard or customized configurations of hardware and software to manage stored information. Because many data management and storage solutions are available, it is difficult for users to select a data management solution that satisfies most storage and processing needs without excluding some types or formats of data. For example, structured data may not be processed using the same data management and storage solutions as data that is not structured. Therefore, data often becomes stored or distributed across different locations, in different formats, requiring multiple different systems to manage or access data.

Accordingly, many users and organizations build data lakes to break down data silos, centralize data assets, and unlock the potential of their data. Many of these users use data lake management services to simplify data lake setup, security, and management. For example, users may use services that can model their data objects as tables with semi-structured data, centrally define security policies on tables and their columns, and securely analyze the data through a wide variety of analytics and ML services.

BRIEF DESCRIPTION OF DRAWINGS

Various embodiments in accordance with the present disclosure will be described with reference to the drawings, in which.

DETAILED DESCRIPTION

Figure 1:
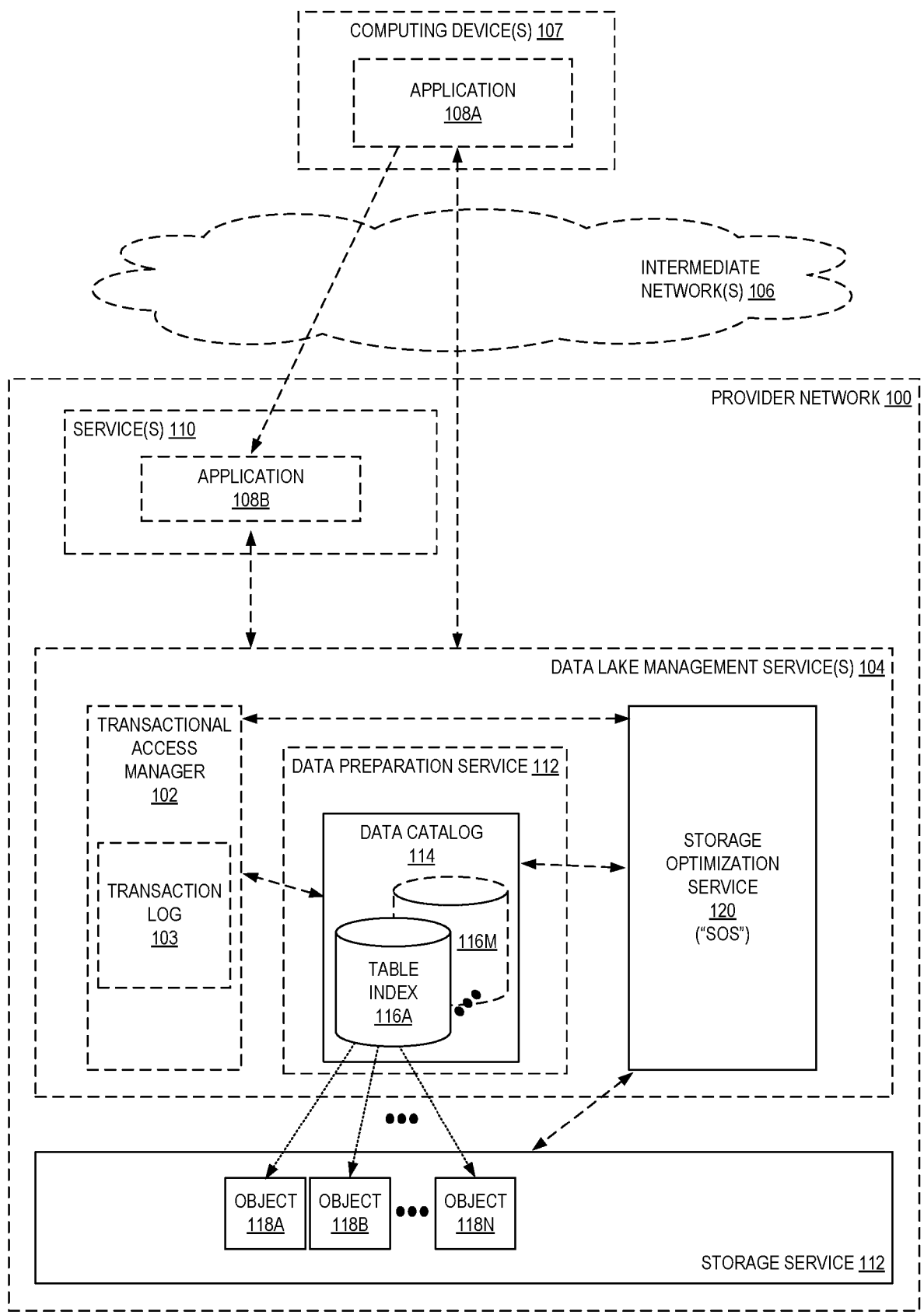
FIG. 1 is a diagram illustrating an environment for storage optimization in a distributed object store according to some embodiments.

The present disclosure relates to methods, apparatus, systems, and non-transitory computer-readable storage media for storage optimization of a data lake in a distributed object store. According to some embodiments, a storage optimization service can monitor changes to data objects referenced by table indices (that can be used to provide relational table-like access to records in a data lake) and determine when the data objects referenced by particular tables can be optimized to provide better performance to users. The storage optimization service can monitor potentially huge numbers of tables for various types of storage optimizations and intelligently prioritize which tables are optimized and which optimizations are performed. The prioritization can be set and/or adjusted in an asynchronous manner to change priorities of potential optimizations over time to ensure that optimizations providing the most benefit to users are generally performed before other optimizations, that low-complexity (or "easy") optimizations are generally performed rapidly, and/or that optimizations are performed at scale in a manner that avoids disrupting user experience or consuming resources needed by other users. In some embodiments, the systems disclosed herein can perform these optimizations in an automated manner that is substantially (or completely) "hands off" from the perspective of the users of the tables, and thus users are relieved of the burden of trying to figure out why their performance is suboptimal, continually monitoring their application and/or storage usage, attempting to perform optimizations on their own, etc.

A data lake (or "centralized data store") may be implemented to store a variety of types of data or data sets. For example, data sets may have different file types or data formats and may be structured (e.g., according to a relational table type structure with records made up of values for one or more columns), semi-structured (e.g., key value-item pairs), or unstructured (e.g., a collection of different files, freeform text, etc.). Because the types of data stored in a data lake may be varied, structural data describing the data set may be determined and maintained for the data set (e.g., within a data catalog) in order to access the data set.

A data lake is an increasingly popular way to store and analyze data that addresses the challenges of dealing with massive volumes of heterogeneous data. A data lake allows organizations to store their data—structured and unstructured—in one centralized repository. Because data can be stored as-is, there is no need to convert it to a predefined schema.

One of the main challenges of using a data lake is finding the data and understanding the schema and data format. Accordingly, users may use a fully managed data catalog and ETL (extract, transform, and load) service, such as AWS Glue®, that simplifies and automates the difficult and time-consuming tasks of data discovery, conversion, and job scheduling. Such a service may crawl data sources (e.g., data objects such as files stored in an object storage service or other location) and construct a data catalog using pre-built classifiers for a variety of data formats and data types, such as comma separated values (CSV), Apache Parquet, JavaScript Object Notation (JSON), and/or others. This service may suggest schemas for use with other analytic services and expose the data lake using "tables" that can be used by other applications or services (e.g., an interactive query service such as Amazon Athena™, a cloud data warehouse service such as Amazon Redshift™, a "big data" platform such as Amazon EMR™, etc.) to query the data, such as through use of standard SQL or Apache Hive. Thus, the service may generate tabular indices that allow for the data objects that belong to a "table" to be identified, obtained, and used for querying, analytics, or the like.

Typically, many users of data lakes continue to add data objects over time, e.g., computer log files, updated business records, and the like. For example, periodically (e.g., every day, hour, week, etc.) a user may upload additional data objects (e.g., files) to a data lake, and these data objects may be added to a table exposed by a data catalog type service described above. Over time, the number of data objects that store the records of the table may span to tens, hundreds, thousands, or even millions (or more).

Though users may still operate upon this data, e.g., using their own special purpose applications, analytics services, or the like, in some cases the performance of their applications may be severely degraded as a result. For example, a user may have a use case where they need to examiner all the records of a table—which may be stored by a large number of files, each storing a small number of the records—and thus the application needs to open and access all of these files. This may be very resource intensive, requiring network requests and responses to be sent for every single file, which could number in the millions or more. Thus, a significant overhead is introduced to simply obtain the records of the table. In contrast, had these records all been stored in one file or a comparatively small number of files, the analysis might be performed much more rapidly by some applications, as they only need to retrieve and open a few files.

However, in some cases having records spread across many different files might be beneficial. For example, if a new file is uploaded every day containing records pertaining to that day, there could be many files but a query seeking to access records from only one day might perform well—e.g., through use of a table index of a data catalog, a single file may be identified as including the records that are desired, and this single, relatively small file may be retrieved (as opposed to having to retrieve huge numbers of files or very, very large files that would then need to be read through.)

As another example, a user may be storing records in a particular format (e.g., a row-based format, such as CSV) but then use an analytics application that could perform much better of the data was stored in a different format (e.g., a columnar-based format, such as Apache Parquet). Similarly, many other mismatches may exist or be created over time as the data objects of a table change, such as not having columns of values in the records being sorted (when the user's application could perform substantially better if they were).

Accordingly, the way data objects are stored is very important to ensure performance—especially in "big data" type environments where massive amounts of data are involved. As a result, users should be extremely diligent about arranging their data according to their anticipated usage and repeatedly keep watch of the data and the usage thereof and make changes as necessary. However, this burden is typically far too large for nearly everyone.

Thus, embodiments disclosed herein provide data lake maintenance functionality (in the form of a storage optimization service) that can automatically optimize the underlying data objects that make up a user's data lake. The storage optimization service may, for example, optimize the layout of a user's data objects by deleting objects that are no longer needed, by combining small objects into more reasonably sized objects that particular engines (e.g., applications) prefer. The storage optimization service may ensure the continued operation of the data store but remain out of the critical path of availability, and manage these optimizations rapidly, intelligently, and with little-to-no-risk of errors on-behalf of users, continually improving performance for these users without them needing to worry about it.

FIG. 1 is a diagram illustrating an environment for storage optimization in a distributed object store according to some embodiments. In FIG. 1, a storage optimization service 120 (or "SOS") can monitor and optimize data objects 118 in a distributed object store (e.g., provided by a storage service 112 such as an object storage service). The SOS 120 may be implemented in a provider network 100 as software executed by one (or commonly, multiple) computing devices at one (or commonly, multiple) locations.

A provider network 100 (or, "cloud" provider network) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may use one or more user accounts that are associated with a customer account, though these terms may be used somewhat interchangeably depending upon the context of use. Users may interact with a provider network 100 across one or more intermediate networks 106 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) may be part of, or serve as a front-end to, a control plane of the provider network 100 that includes "backend" services supporting and enabling the services that may be more directly offered to customers.

A cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as an availability domain, or simply a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Customers can connect to an AZ of the cloud provider network via a publicly accessible network (e.g., the Internet, a cellular communication network), e.g., by way of a transit center (TC). TCs are the primary backbone locations linking customers to the cloud provider network and may be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence (or "POPs") outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations, such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 100 often rely upon virtualization techniques. For example, virtualization technologies may provide users the ability to control or use compute resources (e.g., a "compute instance," such as a VM using a guest operating system (O/S) that operates using a hypervisor that may or may not further operate on top of an underlying host O/S, a container that may or may not operate in a VM, a compute instance that can execute on "bare metal" hardware without an underlying hypervisor), where one or multiple compute resources can be implemented using a single electronic device. Thus, a user may directly use a compute resource (e.g., provided by a hardware virtualization service) hosted by the provider network to perform a variety of computing tasks. Additionally, or alternatively, a user may indirectly use a compute resource by submitting code to be executed by the provider network (e.g., via an on-demand code execution service), which in turn uses one or more compute resources to execute the code—typically without the user having any control of or knowledge of the underlying compute instance(s) involved.

For example, in various embodiments, a "serverless" function may include code provided by a user or other entity—such as the provider network itself—that can be executed on demand Serverless functions may be maintained within a provider network by an on-demand code execution service and may be associated with a particular user or account or may be generally accessible to multiple users/accounts. A serverless function may be associated with a Uniform Resource Locator (URL), Uniform Resource Identifier (URI), or other reference, which may be used to invoke the serverless function. A serverless function may be executed by a compute resource, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

A hardware virtualization service (referred to in various implementations as an elastic compute service, a virtual machines service, a computing cloud service, a compute engine, or a cloud compute service) can enable users of the provider network 100 to provision and manage compute resources such as virtual machine instances. Virtual machine technology can use one physical server to run the equivalent of many servers (each of which is called a virtual machine), for example using a hypervisor, which may run at least on an offload card of the server (e.g., a card connected via PCI or PCIe to the physical CPUs) and other components of the virtualization host may be used for some virtualization management components. Such an offload card of the host can include one or more CPUs that are not available to customer instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

Accordingly, the SOS 120 may be implemented using serverless functions, compute resources, and the like, which may be provided by a serverless code execution service and/or hardware virtualization service.

In some embodiments, a user that owns, manages, controls, etc., a particular data lake may cause data objects (e.g., objects 118A-118N) to be uploaded or otherwise stored to one or more locations of a storage service 112 and may interact with a data preparation service 112 to create one or more "tables" (based on the data objects) within a data catalog 114 for the data objects. In response, the data preparation service 112 may use a user-provided schema, and/or crawl the set of data objects to infer a schema, which may possibly be confirmed by the user. Thereafter, the data preparation service 112 may generate table indices 116A-116M for the table(s), which may be data structures (e.g., trees) that allow for the rapid identification of ones of the data objects for queries against the table(s). The data preparation service 112 may then return identifiers of these data objects (e.g., URLs, storage paths, object names, or the like) to a calling application (e.g., application 108A executed by one or more computing devices 107, application 108B executed by a service 110 such as a "big data" or analytics service, hardware virtualization service, or the like) that can retrieve the identified data objects; however, in other embodiments the data preparation service 112 may itself obtain the identified data objects and return them (or data based on them, such as a query response including them) to the calling application 108.

In some embodiments, the user may designate the tables as being "governed" tables that are managed by a transactional access manager 102 or may directly interact with the transactional access manager 102 to request that particular tables be managed. The transactional access manager 102 may provide a storage API that provides ACID (atomic, consistent, isolated, durable) transactions for data lakes on a distributed object storage service. The storage API, provided by the transactional access manager, may allow multiple users to concurrently and reliably insert, delete, and modify rows across these tables, making it easy, for example, to keep data lakes continuously up-to-date while simultaneously running analytics queries and machine learning (ML) applications that return consistent and real-time results. Users can in some embodiments build analytics applications that directly read from and write to their data lakes through the transactional access manager's public APIs, and users can query their data lakes through analytics and/or machine learning services that utilize these (or similar) interfaces. The transactional access manager 102 may provide such atomic transactions through use of a transaction log 103, which may identify changes to tables (and/or data objects) and be used to commit and/or rollback transactions.

In some embodiments, when a table is created (e.g., via a user interaction with the data preparation service 112) or transactionally enabled (e.g., via a user interaction with a transactional access manager 102), the service may directly (e.g., via a message) or indirectly (e.g., via a queue, log, database, etc., that can be accessed by the SOS 120) notify the SOS 120 that the table exists and is to be monitored for storage optimization. This may occur upon the user requesting this service, may be selected by default (and optionally turned off by users), etc.

In some embodiments, the user may provide the SOS 120 with a set of permissions to access and modify the user's data via other services of the provider network 100, e.g., via read/write permissions to the data catalog 114, the transactional access manager 102, the storage service 112. In other embodiments, the user may instead create a "role" (providing permissions/access controls allowing access to the user's data) for the SOS 120.

The SOS 120 may then begin monitoring these tables and/or data objects for the potential need for storage optimization and perform optimizations in response. In some embodiments, the SOS 120 may periodically perform this monitoring and/or optimizations (e.g., according to a schedule, such as by periodically looking at the transaction log 103 to detect tables that have changed over a recent period of time) though in other embodiments the SOS 120 may be event-driven.

For example, in some embodiments the SOS 120 may register an interest in an event stream associated with particular tables, e.g., by sending a request to the transactional access manager 102, and/or storage service 112, and/or another control plane type entity that records changes made to data objects and/or tables, and thereafter the SOS 120 may receive messages from the service(s) indicating that particular data objects and/or tables have been modified. Thus, if a user adds a data object to (or deletes a data object from) the storage service 112 that is part of a table of interest, the transactional access manager 102 and/or data preparation service 112 and/or storage service 112 (or even another control plane service) may send a message to the SOS 120, which may include an identifier of the action performed (e.g., add, delete), a size of the data object that was added/removed/modified, an identifier of the object, or the like.

With this "stream" of changes, the SOS 120 may analyze the involved table(s) to determine whether the data objects of the table should be optimized. In this manner, the SOS 120 may consider only those tables that are actively changing, which may be a subset (and in many cases, a very small portion) of the overall tables managed by the data preparation service 112—this allows the SOS 120 to be able to effectively operate at scale in large environments, as it is likely not possible to analyze each table (of potentially millions, billions, or more) that may exist on a periodic basis.

In some embodiments, with a detected change to a table, the SOS 120 may gather information about the data objects of the table. For example, the SOS 120 may send a request to the data catalog 114 (e.g., a "GetTable" call) to gather information about the table's schema, storage format, partitioning layout, etc. The SOS 120 may also obtain a list of files that are part of the table, e.g., by sending a "GetTableObjects" or similar request. This call, in some embodiments, may be made in a "partial" form by requesting only those table objects that have changed since a previous time (e.g., via a "since" argument—specifying a time or a version number—passed with a GetTableObjects call).

With this table metadata (e.g., from the GetTable call) and object identifiers, the SOS 120 can determine whether the table is sufficiently "dirty" to warrant a storage optimization as described later herein with regard to subsequent figures, which may be based on an analysis of the data objects themselves, the table metadata, actual usage history and/or predicted usage of the table, queries run against the table, which particular applications or services have used the data, geographic locations of applications or services that have used the table, and potentially many more. If the table is in need of one or more optimizations, the SOS 120 may place an entry into a queue for the table, which may identify the one or more optimizations. In some embodiments, an asynchronous process of the SOS 120 may periodically run to determine a "new" priority associated with the entry for the table, which may cause the table optimization(s) to be moved up or down in the queue so that its optimization(s) are prioritized or deprioritized.

An orchestrator of the SOS 120 may take entries from the queue—based on their priority values, e.g., by always selecting the entry with a highest priority value, and based on other factors such as actual or predicted user and/or system load (as described later herein)—and cause one or more optimizers to perform the optimization(s). For example, if an optimization is to be performed to eliminate any data objects from the table within a partition that are below the table format's ideal size, the optimizer(s)—which may be a single entity or a cluster of entities working cooperatively—may begin a transaction, read those data objects from the storage service, combine the data from those sub-optimally sized files into more appropriately sized files, and write the resulting files back to the storage service 112. The newly-written files may be added to the transaction, e.g., by calling an UpdateTableObjects( ) API, to cause the table to reference the newly-created files. In some embodiments, the original small objects may be logically removed from the table's current snapshot (e.g., by calling an UpdateTableObject( ) API). With the optimization work complete, the optimizer may then commit the transaction (e.g., by calling the transactional access manager 102 CommitTransaction( ) API) to durably persist the changes to the table. In some embodiments, the optimizer(s) may also delete the "old" smaller objects from the storage service, e.g., which may involve determining that no historical snapshot (provided by the transactional access manager 102) still requires those objects, which may again involve calling the transactional access manager 102 to determine whether those objects are still referenced by any version of the table.

Figure 2:
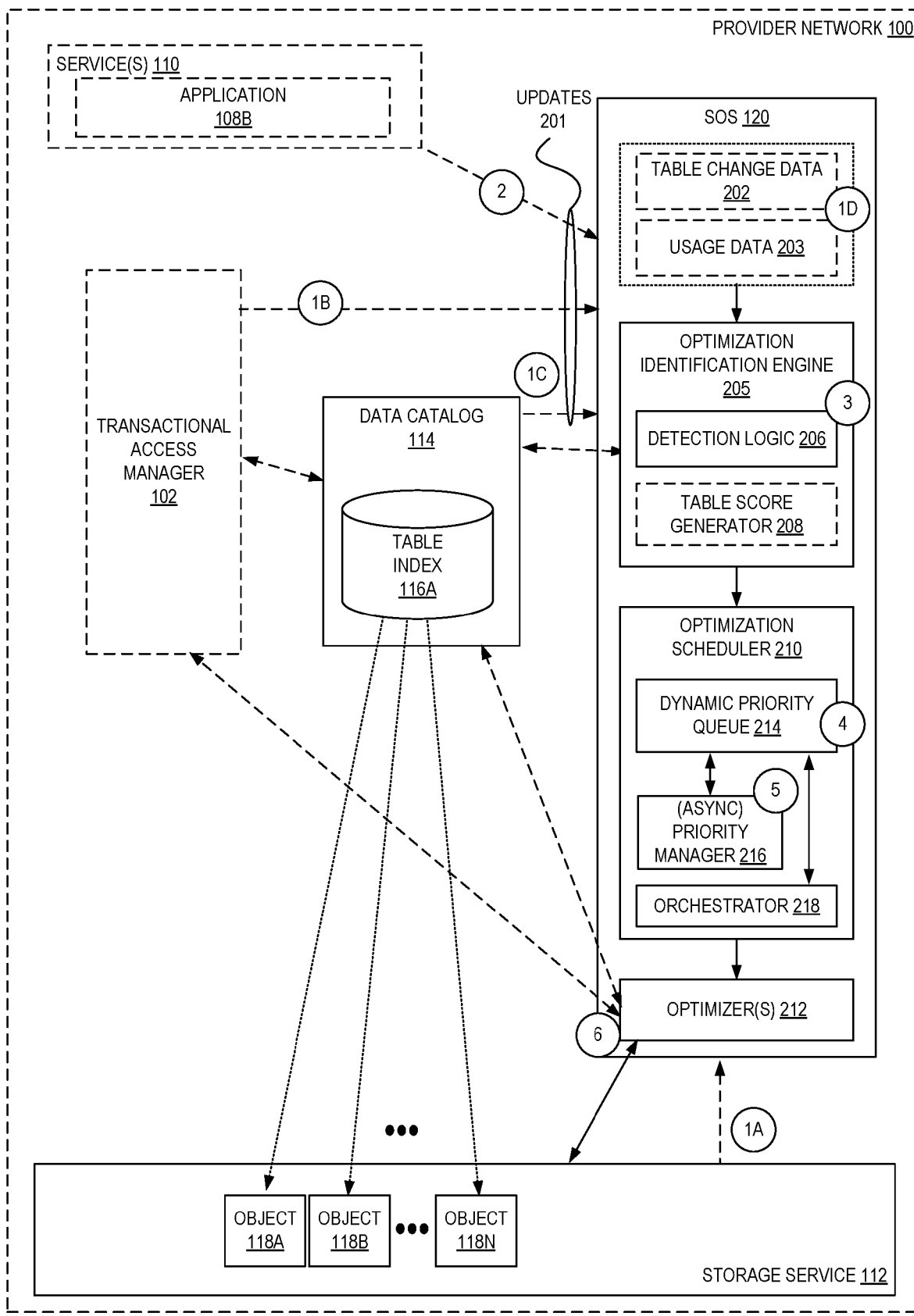
FIG. 2 is a diagram illustrating exemplary components of a storage optimization service for efficiently performing storage optimization in a distributed object store according to some embodiments.

For further detail, FIG. 2 is a diagram illustrating exemplary components of a storage optimization service for efficiently performing storage optimization in a distributed object store according to some embodiments. As discussed earlier, in some embodiments the SOS 120 may be notified of "events" in the form of updates 201 to the data objects storing records of a virtual table (shown here as "1,000 new data objects added to Table X"), and thus referenced by a table index 116A corresponding to the table. For example, in some embodiments at circle (1A) the storage service 112 may directly or indirectly send update 201 messages to the SOS 120 reflecting updates (e.g., new files, deleted files) to one or more storage locations that store data objects for a table. Alternatively, or additionally, in some embodiments a transactional access manager 102 may send these types of update 201 messages at circle (1B) reflecting changes at the table level and/or at the data object level resulting from transactional updates made to the table by users. Moreover, in some embodiments as reflected by circle (1C), the data catalog 114 itself may send update 201 messages to the SOS 120 reflecting updates to the table. Any or all of these event sources may used in various embodiments, and the information may be used (and possibly persisted) by the SOS 120 as table change data 202 at circle (1D). In some embodiments, only when a threshold number of changes to a table have been made (e.g., over 1,000 objects have been modified) will the optimization identification engine 204 begin analysis; this can prevent the optimizations from occurring too rapidly, e.g., while a large number of data objects are being ingested into a table.

With the table change data 202—and optionally with other metadata associated with the table as described above, such as the schema, storage format, partitioning layout, etc., which may be obtained from the data catalog 114, an optimization identification engine 204 may detect tables that would benefit from particular storage optimizations at circle (3), and optionally may also determine a level of need to perform these optimizations—for example, whether the optimization will or will not substantially affect performance. Additionally, or alternatively, the updates 201 received and used for the optimization detection (and/or corresponding determination of priority/importance of the optimizations) may include usage (or access) data 203 indicating how one or more tables are being utilized. This usage data 203, in some embodiments, includes predicted, actual, and/or historic information describing frequencies and/or timing of access to tables (or to specific data objects), types of applications or services that access the tables, which user or users utilize the tables, types or structures of queries (or other accesses) that are issued involving the tables, numbers or types of tables accessed by the involved users, geographic locations associated with querying users or applications, or the like.

Figure 3:
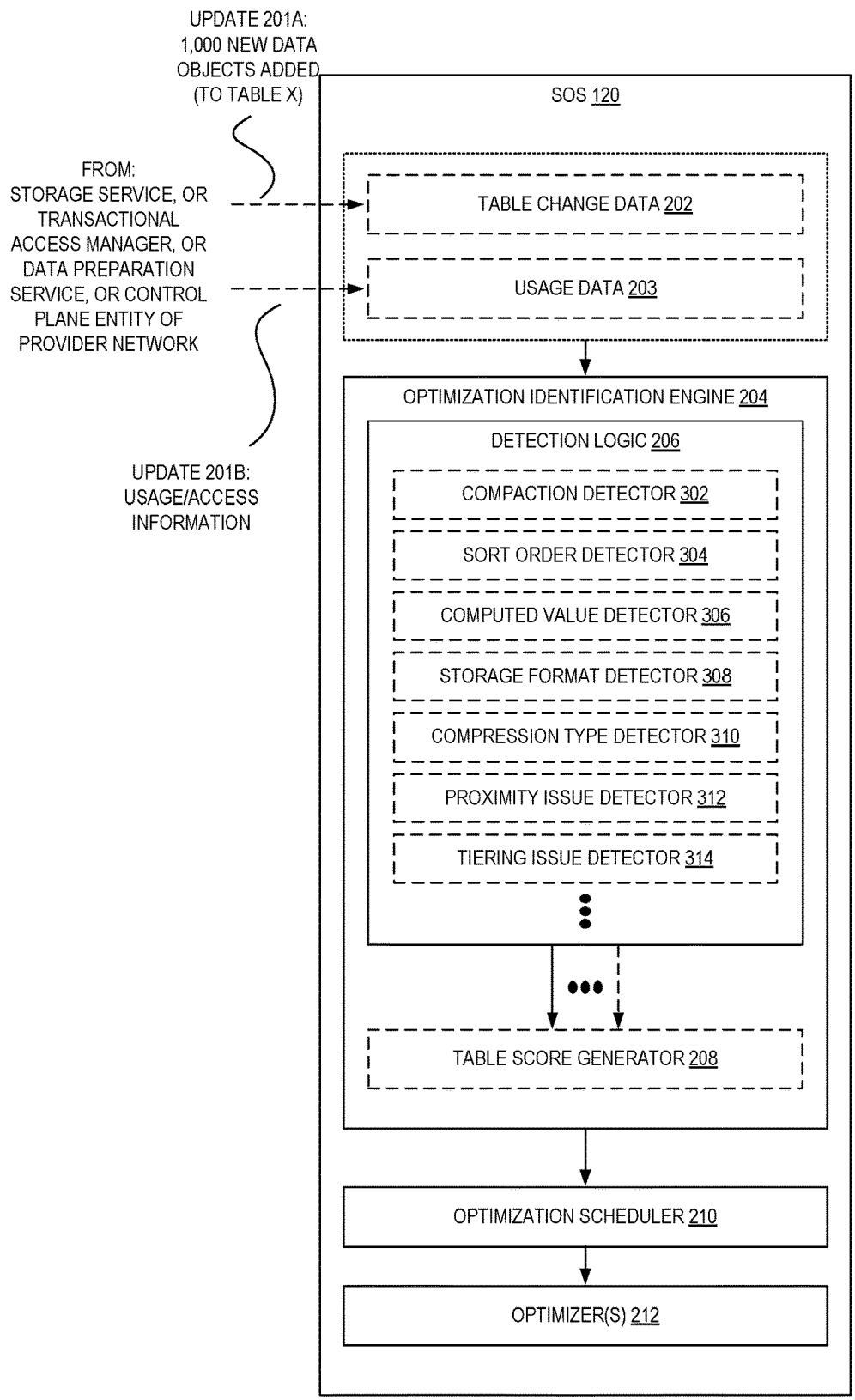
FIG. 3 is a diagram illustrating exemplary components of an optimization identification engine of a storage optimization service for use in efficiently performing storage optimization in a distributed object store according to some embodiments.

For example, in some embodiments the optimization identification engine 204 includes inefficiency detection logic 206 that can detect tables that display indications of have a suboptimal storage-related characteristic. For example, FIG. 3 is a diagram illustrating exemplary components of an optimization identification engine of a storage optimization service for use in efficiently performing storage optimization in a distributed object store according to some embodiments. As shown, the detection logic 206 may include one or more detectors (e.g., functions, sets of logical statements representative of heuristics, etc.) 302-314, each adapted to detect a particular storage issue that could be optimized. In this example, the inefficiency detection logic 206 may include a compaction detector 302 that can detect scenarios where records from multiple files (e.g., files of less than a threshold amount of size) could be consolidated into fewer files to improve performance. For example, the compaction detector 302 may be adapted to detect if a threshold amount of the data objects of a table are less than a particular size, or whether there is more than another threshold amount of data objects in total. This compaction detector 302 (and other detectors described herein) may also take into account previous usage of the table, e.g., by identifying which particular types of applications access the table (and thus, can identify which optimizations are helpful for particular applications), what types of table usage often occur (e.g., where particular ranges of values are selected, whether large amounts of the table are frequently read, etc.). Such usage data could come from the data preparation service 112, or directly from other service(s) 110, for example, as shown by circle (2).

The inefficiency detection logic 206 may also, or alternatively, include a sort order detector 304 that can detect scenarios in which the sort order of the records could be adjusted (or, the data could simply be sorted in the first place) to improve performance. For example, given usage history data 203 indicating that a particular user has used (or frequently uses) a sort dimension on a particular column, and the data objects are stored using a columnar storage format that supports predicate pushdown, and the user is using an engine (e.g., application 108) to query the table that also supports predicate pushdown, the sort order detector 304 can identify the table as being a candidate for sort order optimization.

The inefficiency detection logic 206 may also, or alternatively, include a computed value detector 306 that can detect scenarios, based on usage data 203, in which a user has sought (or frequently queried for) a computed value (e.g., a sum of values from two columns, such as via a query selecting a sum grouped on a particular column) where that computed value could be precomputed and stored to improve performance. The inefficiency detection logic 206 may also, or alternatively, include a storage format detector 308 that can detect scenarios in which a file format could be changed to improve performance, e.g., by detecting table data objects being files in type CSV (e.g., a row-based format), and detecting via usage data 203 that the user frequently performs filtering and/or uses ORDER BY queries, the data objects file format could be changed to another storage format (e.g., a column-based format such as Parquet) to improve performance.

The inefficiency detection logic 206 may also, or alternatively, include a compression type detector 310 that could determine that compressing the data objects (e.g., via zip, bzip, gzip, etc.) or uncompressing the data objects could improve performance; for example, one querying engine used by the user (detected based on usage data 203 identifying the query engine or a service that is known to use it) may perform poorly with compressed data objects, while another engine may perform well with encrypted files and the data objects may be very large and likely good candidates for substantial space (and resulting bandwidth/transfer time) savings.

The inefficiency detection logic 206 may also, or alternatively, include a proximity issue detector 312 that can detect, based on usage data 203 information, that data objects of a table are not located closely to where the data objects are being used; for example, a user may use an application in Europe but may have their data objects stored North America, and if the data objects were stored in Europe the performance may be improved due to quicker transfer of the stored data objects to the application.

The inefficiency detection logic 206 may also, or alternatively, include a tiering issue detector 314 that can detect differences in actual usage (via usage data 203) between particular data objects (or particular records within data objects) where the data objects could be "tiered" in storage to place more frequently needed data objects (or records) in a more responsive, higher bandwidth storage location and less popular/needed data objects in a less speedy storage location. Thus, based on which data objects are being used—optionally as determined based on an analysis of what rows show up in query results—certain data objects can be made more quickly available to the querying application.

Each detector may output a boolean type result (e.g., yes or no) indicating whether the corresponding storage issue was detected, and optionally may provide additional information such as specific optimization specifics that should be done—e.g., the proximity issue detector 312 may indicate a particular geographic (or similar) location where the data objects should be moved to, the sort order detector 304 may indicate which values should be sorted and in which order, etc. However, many other configurations known or derivable by those of skill in the art may similarly be implemented.

In some embodiments, the inefficiency detection logic 206 may include a table score generator 208 that can determine whether a particular optimization (or set thereof) to a table would actually provide a substantial benefit. As performing storage optimization can require computing resources and/or affect the performance of the table, it may be important to avoid doing optimizations too frequently (or, too infrequently). For example, the compaction detector 302 may detect that one file referenced by a table is small enough to fall beneath a compaction threshold, but if this one file is not frequently accessed, or if there are very large numbers of files overall, performing a compaction might not yield any noticeable result. As another example, the compaction detector 302 may detect that a particular table is (or is not) accessed frequently, and thus the optimization may (or may not) provide a benefit. Thus, the table score generator 208 may generate a table score value indicating to what extent the optimization would improve performance, and in some embodiments, when the table score value is not above a threshold, the optimization will not be performed at this time.

Turning back to FIG. 2, in some embodiments, if an optimization is detected by detection logic 206 (and optionally, if it is determined to have a likely substantial positive benefit per the table score generator 208), the optimization identification engine 204 may place an entry for the table within a dynamic priority queue 214 of an optimization scheduler 210 at circle (4). An asynchronous priority manager 216 may periodically or occasionally update the priority values of the entries in this dynamic priority queue 214, at circle (5), to ensure various types of fairness, e.g., to ensure that optimizations generally become more likely to be performed the longer they wait in the queue, that optimizations providing the highest benefit to users (e.g., in that the lack of optimization would be very noticeable—in a negative way—to the users, or that the optimization would provide a very noticeable positive impact on performance) are performed prior to those that have lower benefits or are not observed by users, etc. An orchestrator 218 may, at circle (6), take entries from the dynamic priority queue 214 based on the priority values and in some embodiments further based on actual or predicted load/utilization within the overall system.

Figure 4:
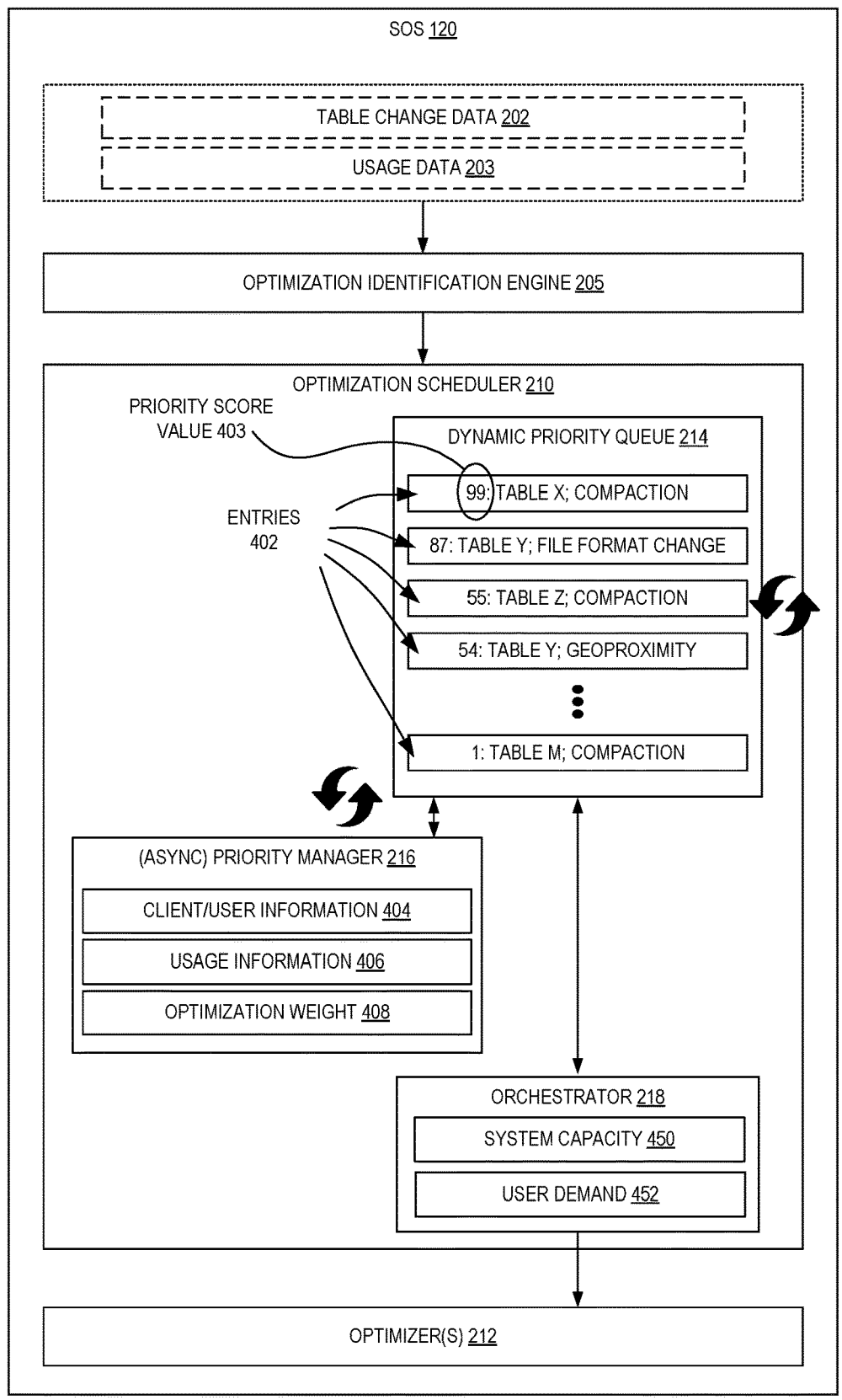
FIG. 4 is a diagram illustrating exemplary components of an optimization scheduler of a storage optimization service for use in efficiently performing storage optimization in a distributed object store according to some embodiments.

For example, FIG. 4 is a diagram illustrating exemplary components of an optimization scheduler 210 of a storage optimization service for use in efficiently performing storage optimization in a distributed object store according to some embodiments. As indicated above, the optimization identification engine 204 may place entries 402 for tables into a dynamic priority queue 214 maintained by the optimization scheduler 210. Initially, each entry may include a table identifier (here shown as "TABLE X" or "TABLE Y" or the like) and an identifier of a particular storage optimization to be performed. In some embodiments, optionally, the optimization identification engine 204 may also provide an initial priority score value 403 for the record—e.g., based on its table score generator 208 determining how substantial benefit would result from the optimization, to allow more beneficial optimizations to be performed comparatively earlier. However, in some embodiments, upon insertion the entries may be assigned a default priority score value 403 (e.g., zero or one) or not assigned a priority score at all.

At periodic intervals (e.g., according to a schedule) a priority manager 216 of the optimization scheduler 210 may examine the entries 402 in the dynamic priority queue 214 and update their priority score values 403. The updating may occur based on a variety of factors, such as client/user information 404, usage information 406, optimization weights 408, etc. This information may be obtained from a variety of sources, such as from the data preparation service 112, the transactional access manager 102, the storage service 112, other service(s) 110 (e.g., providing a big data application, a query engine, or the like).

For example, client/user information 404 may indicate what user(s) are associated with the table (e.g., as owners or managers thereof) or have interacted with the table. For example, the client/user information 404 may indicate which service is used to query the table, such as a big data analytics type application, a data warehousing type application, an interactive querying service, or the like. This knowledge of the involved client application can allow the priority manager 216 to ascertain how beneficial an optimization may truly be—e.g., a file format optimization may be useful to both a first type of client and a second type of client, but it may be known that it will benefit the first type of client a great deal whereas the benefit to the second type of client is marginal. Thus, the priority manager 216 may cause the priority score to be relatively higher when an optimization is known to have a substantial effect on the performance of the client.

Additionally, or alternatively, the client/user information 404 may include information about the other data (or other usage) of tables by the user. For example, the client/user information 404 could include metadata describing the total number of tables used by the user, how frequently these tables are used, how large those tables are, what types of accesses the user makes to them, etc. As a specific example, in some embodiments, the priority manager 216 may determine that although an optimization would be very beneficial for a particular table, its priority score should be relatively low because the user has many other tables, and/or typically only writes to those tables, etc., and thus an optimization that would benefit the querying/reading from the table would not substantially benefit the user.

The priority manager 216 may also obtain and use usage information 406 that is specific to the table. The usage information 406 may reflect how this table has been used, e.g., how frequently it is accessed, how it is accessed (e.g., via particular query patterns), whether it is predominantly written to or read from, if there are patterns of use (e.g., it is queried once a week on Monday mornings), etc. In some embodiments, such as when a user opts-in to allowing the SOS 120 to having explicit visibility into the user's queries, the SOS 120 may obtain actual logical and/or physical query plans for the user's queries, or in some embodiments the SOS 120 may obtain sanitized versions thereof to ensure privacy.

Thus, if the table is rarely or never read from, the optimization may not be particularly useful, and thus the priority score value may be comparatively reduced. In contrast, if the table is read from frequently, and/or it is accessed via a consistent access pattern that would benefit from an optimization, then the entry for the optimization may be prioritized and its priority score value increased.

This analysis may also involve multiple ones of the information types—e.g., based on the client/user information 404 the priority manager 216 may determine that the user has very few tables (e.g., only one table) and accesses it from a client application that can benefit from the optimization. Further, from the usage information 406 the priority manager 216 can determine that the user accesses this table regularly and uses a particular query that would benefit from the optimization. Thus, based on all of these factors, the priority manager 216 may increase the priority of the optimization. In this manner, in some embodiments the priority manager 216 may be purposefully implemented to cause optimizations for "interactive" type users (who will absolutely notice the optimization or lack thereof) to be prioritized whereas "throughput" type users that may simply write a lot of data to possibly a lot of tables (and thus, would not particularly notice an optimization to one such table) may have their optimizations be comparatively not prioritized.

The priority manager 216 may also take into account a set of optimization weights 408 indicating a relative difficulty or expense (e.g., in terms of time to complete, computing resources needed to complete, etc.) of the optimization. The optimization weights 408 may provide weight values associated with possible optimizations, e.g., where larger (or smaller) weight values are indicative of more difficult/expensive optimizations. In some embodiments, the priority manager 216 may adjust the priority score value of an optimization's entry based on these weights, e.g., to cause an "easy" or "fast" optimization to be more likely to be performed, whereas a more difficult or length optimization may be deprioritized.

In some embodiments, the priority manager 216 may also increment the priority score values of entries 402 in the dynamic priority queue 214 over time to cause entries that remain in the queue, over time, to become more and more likely to be the highest priority entries and thus chosen for execution. For example, every time the priority manager 216 performs an update process (e.g., every few minutes, every hour, etc.) the priority manager 216 may increment the priority score values of each entry currently present in the queue 214—this ensures fairness by preventing an optimization from being repeatedly ignored.

The dynamic priority queue 214 may then be used by an orchestrator 218 to cause the optimizations to be performed by an optimizer agent or a fleet of optimizers 212. It may be particularly important, in some embodiments and environments, that the orchestrator 218 is careful to avoid consuming huge amounts of resource capacity, which could problematically remove available provider network capacity from more pressing user needs—e.g., it may be crucial to avoid impacting the performance of user workloads (or service availabilities) due to using huge amounts of resources performing optimizations. Thus, in some environments there may be a key challenge of overall capacity being limited for such optimizing efforts.

In some embodiments, the orchestrator 218 is purposefully configured to intelligently schedule the optimizations for execution, e.g., by demand-shaping its maintenance activities between other "useful" workloads. For example, the orchestrator 218 may have actual or predicted system capacity 450 and/or actual or predicted user demand 452 data available that can guide the orchestrator 218 in determining how many optimization jobs to run at a time, whether any optimizations should be run at all, etc. This data may be generated by other services, by a control plane component of the provider network, etc., and obtained by the orchestrator 218.

The orchestrator 218 may thus, using this information, demand-shaped its workloads into open spaces in the capacity of the SOS. For example, if the transactional access manager 102 or data preparation service 112 typically has peak usage at a particular time window (e.g., every Wednesday afternoon from 2-4 pm), the orchestrator 218 may reduce a number of optimizations performed at that time (or even not perform optimizations during that time) to ensure excellent performance for those users as well as sufficient resource availabilities. However, during the rest of the day there may be excess capacity available, and thus the orchestrator 218 may make use of this availability by scheduling more of its optimizations at those times. Notably, the orchestrator 218 may make these decisions based on predicted and/or historic usage data, and/or based on real-time usage data obtained from other services. For example, predicted/forecast data may indicate that a next hour of time should have low customer traffic, but the orchestrator 218 may obtain real-time information indicating that an unexpected spike in user traffic is occurring, and thus may avoid scheduling optimization work. Similarly, the orchestrator 218 may obtain real-time information indicating that user traffic is currently very low but may also have insight via predicted/forecast data that indicates that a next hour of time should have very high customer traffic, and thus may avoid scheduling optimization work.

The orchestrator 218 may also halt current optimization work when needed, e.g., when it obtains "backpressure" type data such as current user utilization information indicating an emerging need for user resources. In some embodiments, the orchestrator 218 may halt a current optimization by sending messages to the optimizer(s) 212, which in turn may stop work and potentially abort their current transactional changes to the tables. Additionally, or alternatively, the optimizer(s) 212 may be crafted to utilize optimization procedures that are interruptible at particular points of their workload, and thus upon receiving a signal to halt their optimization, they may continue executing until they reach such a halting point. Thereafter, when the user demand has reduced, the orchestrator 218 may signal the optimizer(s) 212 to continue work and pick up where the optimization(s) were halted.

Figure 5:
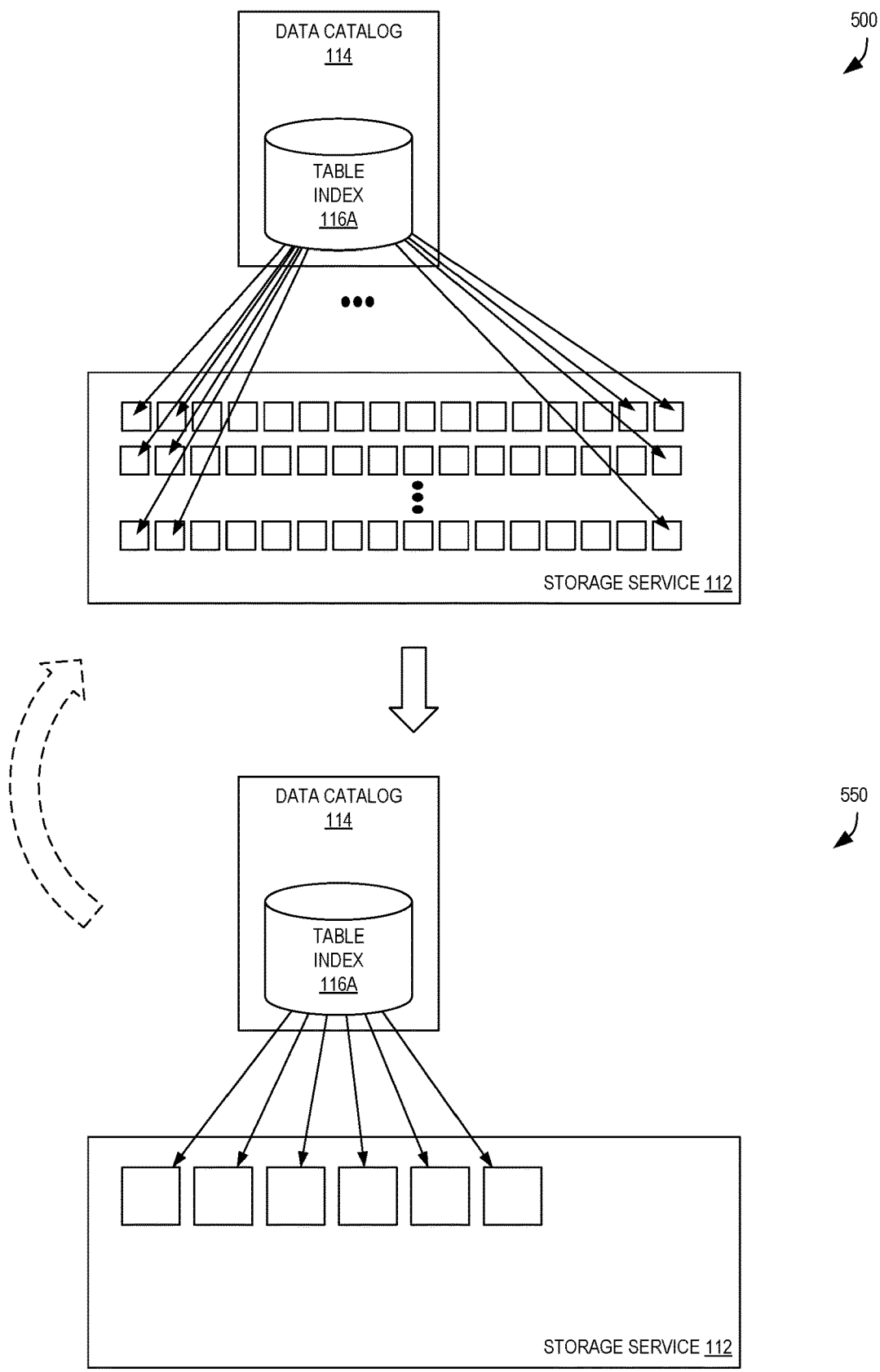
FIG. 5 is a diagram illustrating an exemplary compaction optimization involving data objects in a distributed object store referenced by a table according to some embodiments.

For further understanding, several example optimizations that can be implemented in various embodiments are illustrated with regard to subsequent figures. FIG. 5 is a diagram illustrating an exemplary compaction optimization involving data objects in a distributed object store referenced by a table according to some embodiments. In this example, as shown by 500, a table index 116A corresponding to a table may have been updated by a client writing a large number of data objects (e.g., files) to the table—which could be thousands or more—and based on a number of factors the SOS 120 may determine (e.g., via a compaction detector 302) to compact them into fewer data objects. For example, the SOS 120 may determine that a particular service/application that has been observed to utilize the table (or a particular pattern of queries) is known to be non-performant with large numbers of data objects. Thus, as shown by 550, a compaction operation may be performed to read the data objects, consolidate them into a smaller number of data objects (e.g., a single data object, or multiple data objects as shown here), write those new data objects to storage, and update the table index to reference the new data objects instead of the old data objects. This set of operations for the optimization may be performed in a transactional basis, e.g., through use of the transactional access manager 102.

Though not shown but as alluded to with the dashed arrow, in some scenarios it may be the case that the reverse operations may be performed—e.g., records in just a few larger files may be broken into more files (e.g., organized by partition), which may allow for more efficient querying in some scenarios, such as when queries only seek records from a particular partition (e.g., from a particular date, or involving a particular "key" type value).

Figure 6:
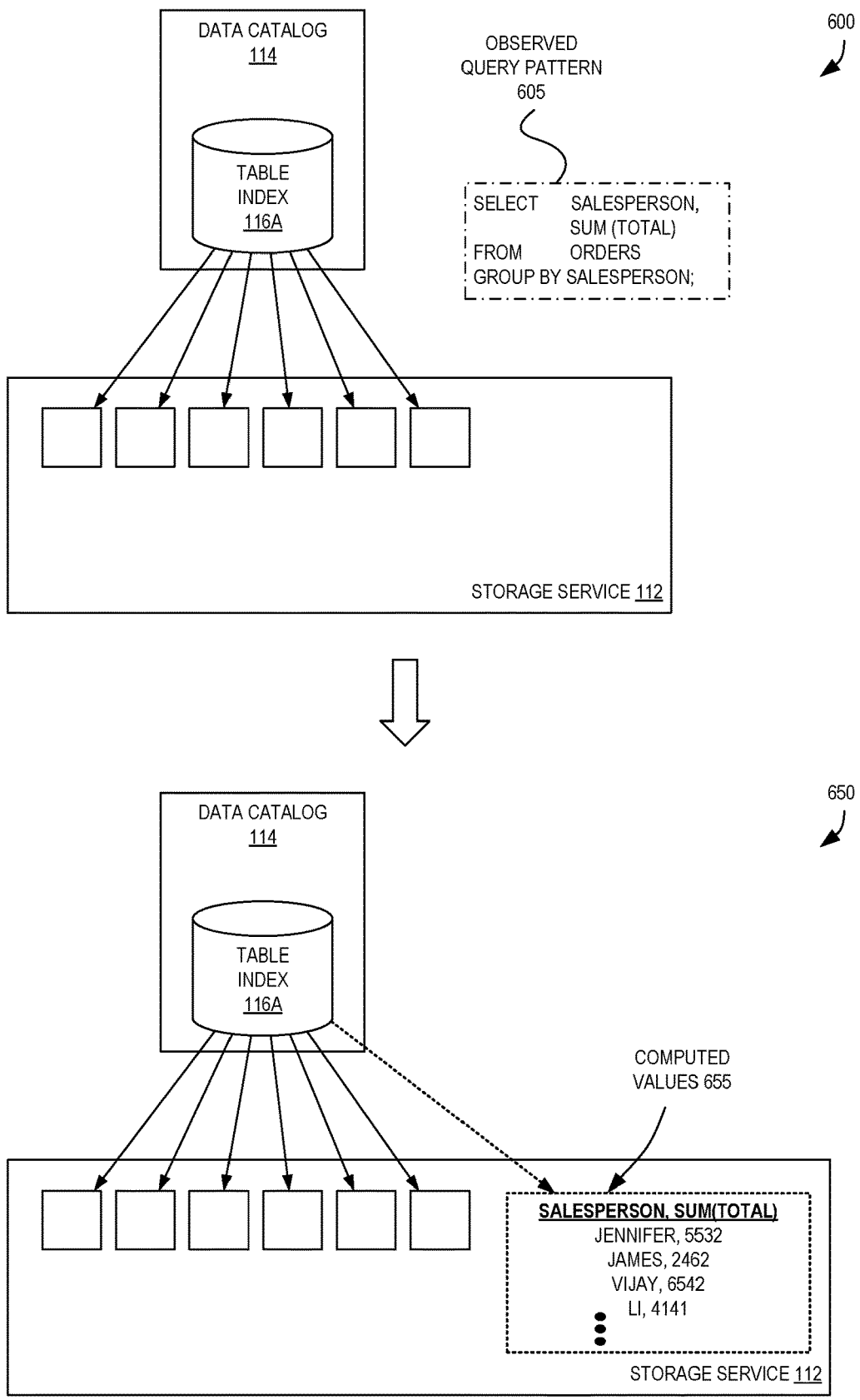
FIG. 6 is a diagram illustrating an exemplary computed value optimization involving data objects in a distributed object store according to some embodiments.

As another example, FIG. 6 is a diagram illustrating an exemplary computed value optimization involving data objects in a distributed object store according to some embodiments. In this example at 600, the SOS 120 may obtain data indicative of a repeating query pattern issued against the table—here, a selection of a computed value—SUM(TOTAL)—where there is a "group by" of another column (here, SALESPERSON). In some embodiments, the SOS 120 may determine (e.g., via a computed value detector 306) that computing these values and storing these values may significantly improve processing for these queries (as the data is immediately available and thus does not need to be computed on-the-fly by accessing the potentially huge amount of records involved), and thus as shown at 650, the computed values 655 may be stored in an existing or new data object.

Figure 7:
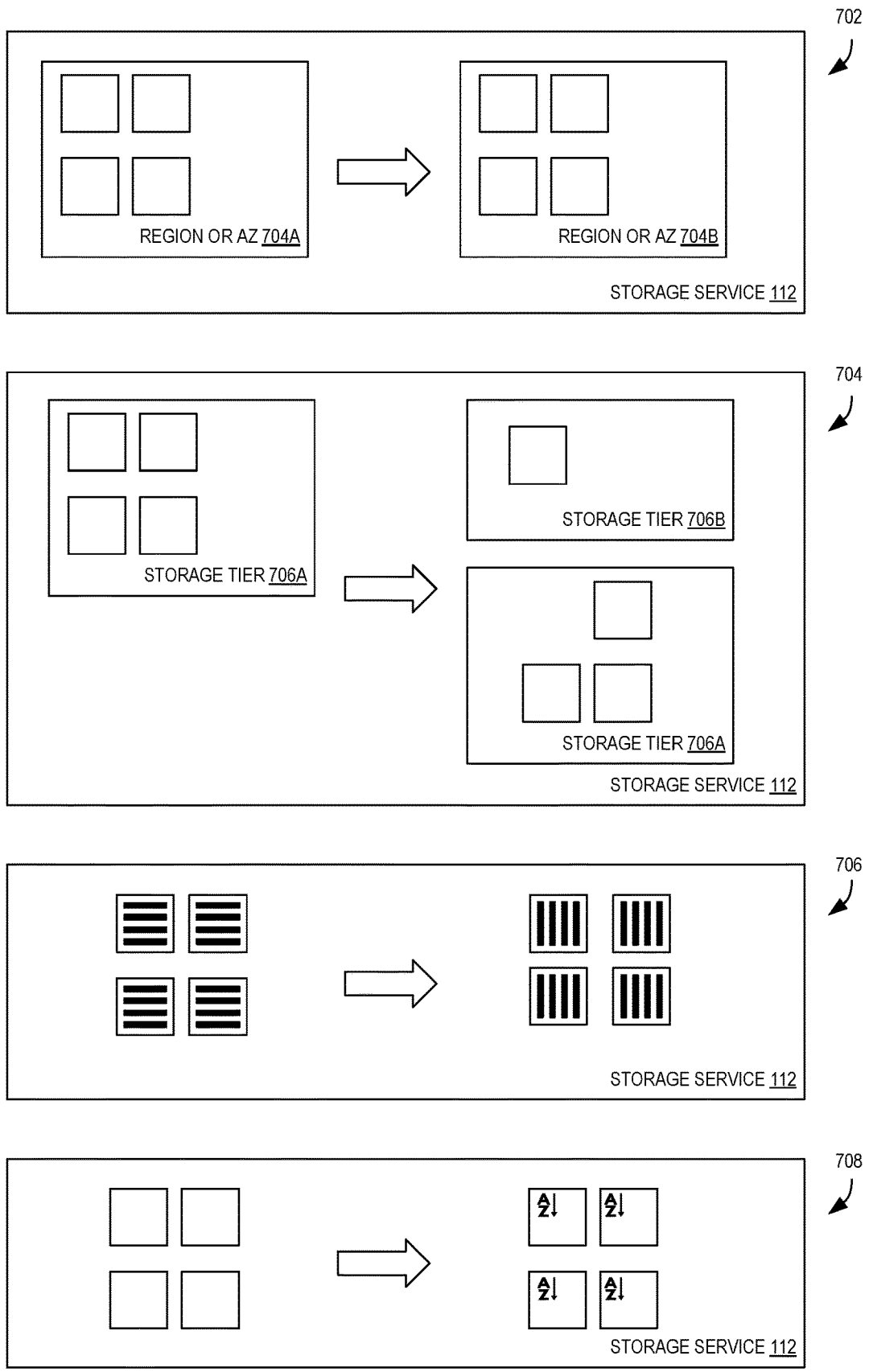
FIG. 7 is a diagram illustrating several exemplary optimizations involving data objects in a distributed object store according to some embodiments.

FIG. 7 is a diagram illustrating several exemplary optimizations involving data objects in a distributed object store according to some embodiments. As shown at 702, the SOS 120 may determine (e.g., via a proximity issue detector 312) that the data objects commonly accessed by a user are stored in a first geographic location (corresponding to a first region or AZ 704A of a provider network) that is distant from the place where the data objects are used, e.g., by a service operating in a second geographic location (corresponding to a second region or AZ 704B of a provider network). The SOS 120 then cause the data objects to be moved from one location to another, e.g., by instructing the storage service to copy (or move) the objects to a new location in the second region or AZ 704B and thereafter updating the table index.

At 704, the SOS 120 may determine (e.g., via a tiering issue detector 314) that placing some data objects in a first storage tier, and others of the data objects in one or more other storage tiers, would result in better performance and/or expense for the user, and/or better overall performance of the system across all of its users. For example, if a subset of the data objects are very frequently accessed (e.g., over a recent period of time), the SOS 120 may determine that these objects could be placed in a storage tier that is faster to access (i.e., provides lower latency), provides more bandwidth, provides higher durability/reliability levels (possibly at a higher comparative cost), etc., while other objects (that are infrequently accessed, or perhaps not ever accessed) could be placed in other tiers that may provide more latency or less throughput or less reliability/durability (e.g., "only" 99.9% availability and 99.999999999% durability, whereas the other tier may have higher availability and/or durability), which the user may desire as the data objects needed are always quickly available (and thus the user's perceived performance is very high) while data objects not needed might be stored at a lower cost to the user, without the user needing to be involved in managing this configuration over time. In this example, four data objects in a general-purpose storage tier 706A may be analyzed and one often-accessed data object could be moved into a "faster" or more performant storage tier 706B (and/or more reliable/durable); of course, as indicated above, data objects may be split into more such tiers, different tiers, etc., and thus this is simply an example provided for the sake of understanding. Thus, a request identifying an object and a new tier (via a tier identifier) for the object may be transmitted, e.g., to a storage service, to cause the object to be moved into the new tier, which may involve causing the object to be transmitted to a new storage location (and thereafter de-referenced and/or deleted from the old storage location); however. In some embodiments, the object may be included in the request itself, which may be a request to store the object in the identified tier.

At 706, the SOS 120 may determine (e.g., via a storage format detector 308) that a set of data objects could be saved in a different format to increase performance for the user's application. For example, a set of data objects stored in a row-based format could be changed to be stored in a more columnar-based format, perhaps when the SOS 120 determines that the user is utilizing a query engine application that is optimized for columnar-based access.

Likewise, at 708, the SOS 120 may determine (e.g., via a sort order detector 304) that a set of data objects could be resorted to improve performance for the user, e.g., by determining that a user frequently (or previously) has used queries with a sort dimension on a particular column, and that the user is using a query engine to query the table that also supports predicate pushdown, the sort order detector 304 can identify the table as being a candidate for sort order optimization.

Figure 8:
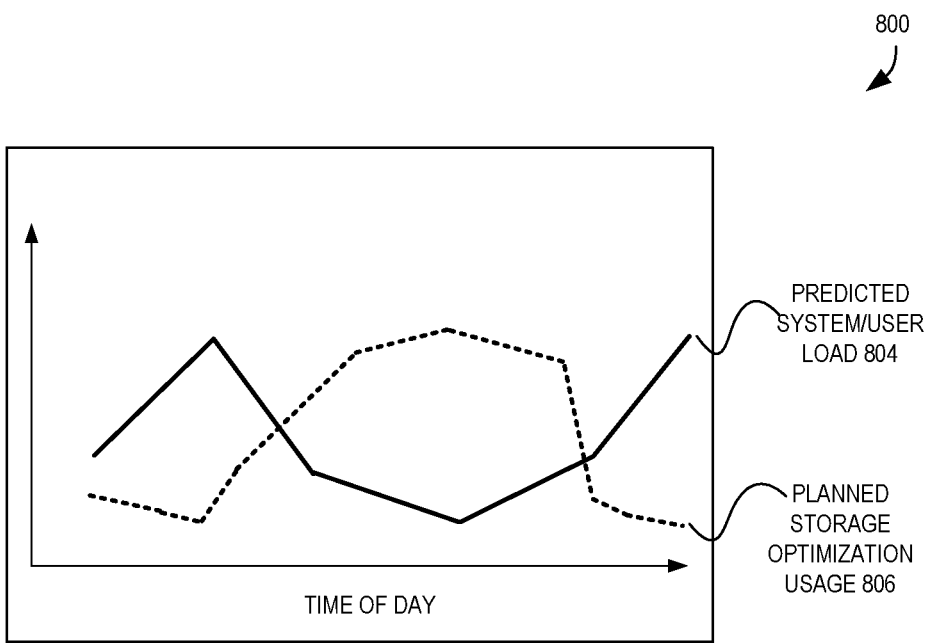
FIG. 8 is a diagram illustrating exemplary predicted or actual user loads, optimization loads, and responsive optimization load adjustment according to some embodiments.
Figure 8:
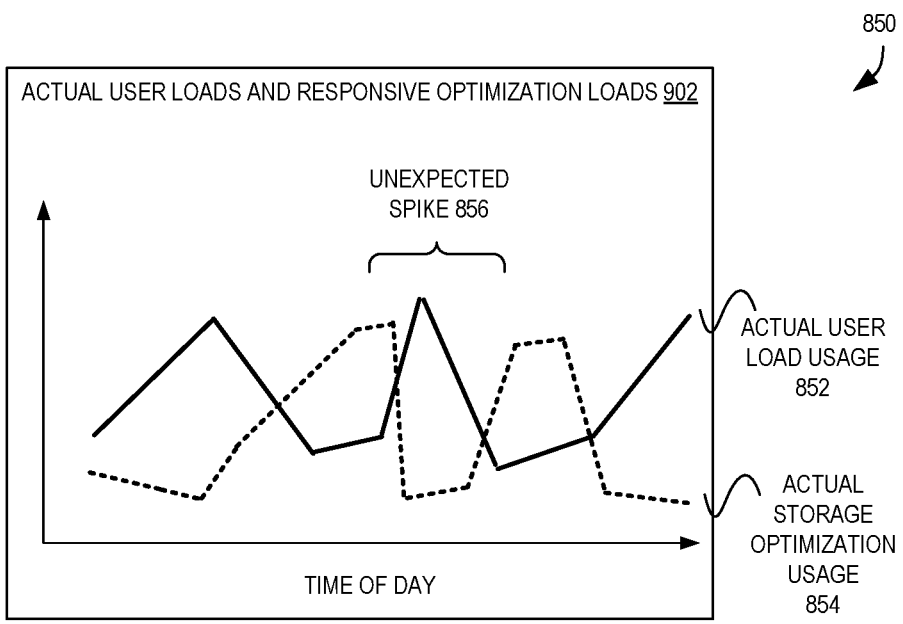

FIG. 8 is a diagram illustrating exemplary predicted or actual user loads, optimization loads, and responsive optimization load adjustment according to some embodiments. As indicated herein, the optimization scheduler 210 may intelligently schedule optimization jobs based on a variety of factors, e.g., system capacity and/or user demand, to ensure excellent performance of the overall system without impacting other users of the provider network.

For example, at 800 a graph is illustrated representing a predicted overall system or user load 804 having a spike early in the day and another spike late in the day. Thus, the SOS 120 can identify periods of low system or user load 804 and tentatively aim to schedule optimization jobs during the "quiet" points of the system or user load 804, as reflected by the dashed line of planned storage optimization usage 806. In this manner, the overall utilization of the system remains comfortably high throughout the day, eliminating "empty" periods where resources are unused, but allowing user loads to operate unburdened by storage optimization tasks.

As indicated herein, the SOS 120 may also obtain and use real-time usage information to make optimization job scheduling decisions. In this example shown at 850, an unexpected spike 856 of user/system usage may occur during the middle of the day, and the SOS 120 may respond to the actual user load 852 by slowing down the beginning (or current) execution of optimization jobs as shown by the actual storage optimization usage 854 line, and may even halt or abort optimization jobs, to allow the spike in traffic to be efficiently handled. When the spike 856 ends, the SOS 120 may again restart any halted/aborted jobs and begin to use more resources for more optimization jobs when they are available, e.g., by speeding up the draining of the dynamic priority queue.

Figure 9:
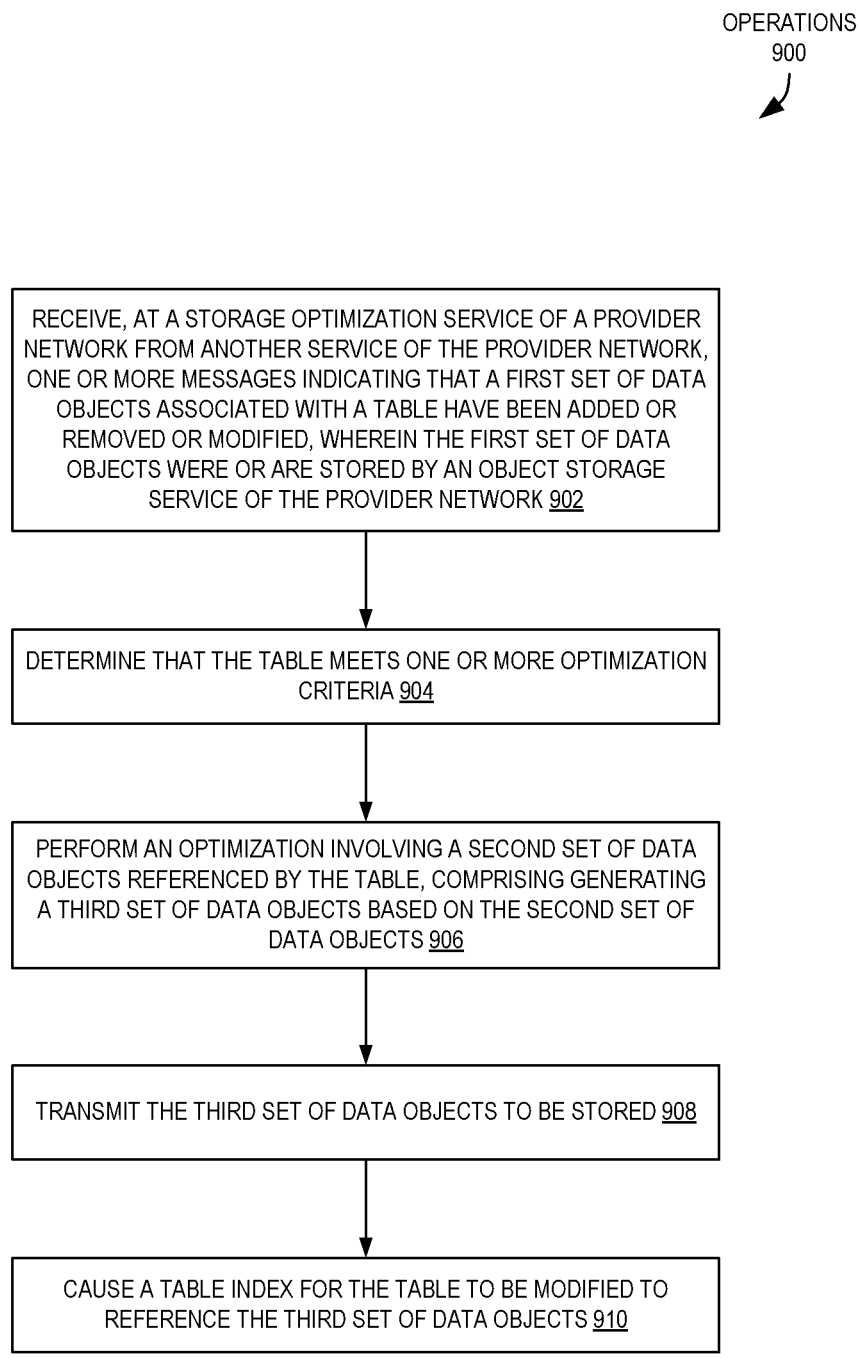
FIG. 9 is a flow diagram illustrating operations of a method for storage optimization in a distributed object store according to some embodiments.

FIG. 9 is a flow diagram illustrating operations 900 of a method for storage optimization of a data lake in a distributed object store according to some embodiments. Some or all of the operations 900 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some embodiments, one or more (or all) of the operations 900 are performed by the SOS 120 of the other figures.

The operations 900 include, at block 902, receiving, at a storage optimization service of a provider network from another service of the provider network, one or more messages indicating that a first set of data objects associated with a table have been added or removed, wherein the first set of data objects were or are stored by an object storage service of the provider network. In some embodiments, the table is a virtual table that is implemented at least in part by a table index that identifies data objects storing records that are part of the table. The data objects may be stored at one or more storage locations of an object storage service of the provider network.

The operations 900 further include, at block 904, determining that the table meets one or more optimization criteria. The operations 900 further include, at block 906, performing an optimization involving a second set of data objects referenced by the table, comprising generating a third set of data objects based on the second set of data objects.

In some embodiments, the optimization is one (or more) of: sorting records stored by the second set of data objects according to values of a field present in the records; consolidating the second set of data objects into the third set of data objects, the third set of data objects having fewer data objects than the second set of data objects but still storing the same records; changing a format of the second set of data objects from a row-oriented format to a column-oriented format, resulting in the third set of data objects that are of the column-oriented format; or compressing or decompressing the second set of data objects, resulting in the third set of data objects.

The operations 900 further include, at block 908, transmitting the third set of data objects to be stored (e.g., by the object storage service); and at block 910, causing a table index for the table to be modified to reference the third set of data objects.

In some embodiments, the operations 900 further include inserting an entry for the table into a queue; generating a priority score for the table; and updating a priority value of the entry within the queue based on the priority score. In some embodiments, the generating of the priority score and the updating of the priority value is performed asynchronously from the inserting of the entry into the queue.

In some embodiments, the operations 900 further include identifying a type of service or application that has accessed the table and generating the priority score is based at least in part on the identified type.

In some embodiments, the operations 900 further include identifying a recency or frequency of accesses to the table and generating the priority score is based at least in part on the identified recency or frequency.

In some embodiments, the operations 900 further include identifying a complexity value of the optimization and generating the priority score is based at least in part on the complexity value.

In some embodiments, the operations 900 further include assigning, by a scheduler, optimization tasks to a fleet of one or more optimizers executed by one or more computing devices based at least in part on priority values of the entries of the queue. In some embodiments, the assigning of optimization tasks is further based on usage data of tables within the provider network, wherein the usage data comprises actual usage or predicted usage.

In some embodiments, the operations 900 further include identifying a storage location, within the provider network, based on a geographic location associated with prior use of the table or a user account that owns or manages the table, where transmitting the third set of data objects to be stored includes sending an identifier of the storage location, to the object storage service, to cause the third set of data objects to be stored at the storage location.

The operations 900 further include, in some embodiments, determining, based on previous usage data associated with the table, at least two classes of data records of the table, where generating the third set of data objects based on the second set of data objects includes: storing a first portion of records from the second set of data objects that belong to a first class in a first one or more of the third set of data objects, storing a second portion of records from the second set of data objects into a second one or more of the third set of data objects, and where transmitting the third set of data objects to be stored includes: sending a first storage tier identifier to the object storage service to cause the first one or more of the third set of data objects to be stored using a first access tier; sending a second storage tier identifier to the object storage service to cause the second one or more of the third set of data objects to be stored using a second access tier, where the first access tier and the second access tier provide different latency or throughput or durability/reliability characteristics.

Figure 10:
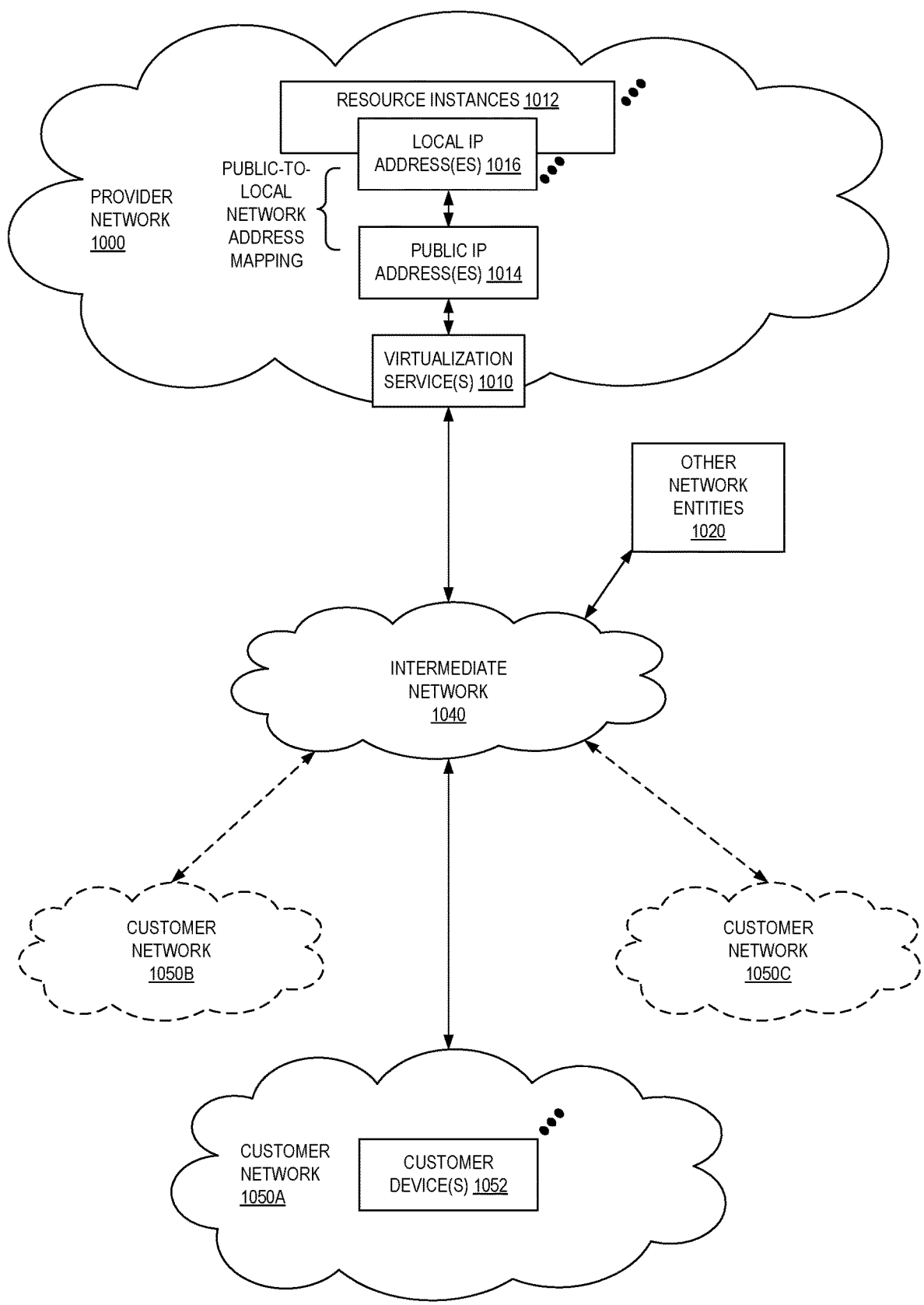
FIG. 10 illustrates an example provider network environment according to some embodiments.

FIG. 10 illustrates an example provider network (or "service provider system") environment according to some embodiments. A provider network 1000 may provide resource virtualization to customers via one or more virtualization services 1010 that allow customers to purchase, rent, or otherwise obtain instances 1012 of virtualized resources, including but not limited to computation and storage resources, implemented on devices within the provider network or networks in one or more data centers. Local Internet Protocol (IP) addresses 1016 may be associated with the resource instances 1012; the local IP addresses are the internal network addresses of the resource instances 1012 on the provider network 1000. In some embodiments, the provider network 1000 may also provide public IP addresses 1014 and/or public IP address ranges (e.g., Internet Protocol version 4 (IPv4) or Internet Protocol version 6 (IPv6) addresses) that customers may obtain from the provider 1000.

Conventionally, the provider network 1000, via the virtualization services 1010, may allow a customer of the service provider (e.g., a customer that operates one or more customer networks 1050A-1050C (may also be referred to as client networks) including one or more customer device(s) 1052) to dynamically associate at least some public IP addresses 1014 assigned or allocated to the customer with particular resource instances 1012 assigned to the customer. The provider network 1000 may also allow the customer to remap a public IP address 1014, previously mapped to one virtualized computing resource instance 1012 allocated to the customer, to another virtualized computing resource instance 1012 that is also allocated to the customer. Using the virtualized computing resource instances 1012 and public IP addresses 1014 provided by the service provider, a customer of the service provider such as the operator of the customer network(s) 1050A-1050C may, for example, implement customer-specific applications and present the customer's applications on an intermediate network 1040, such as the Internet. Other network entities 1020 on the intermediate network 1040 may then generate traffic to a destination public IP address 1014 published by the customer network(s) 1050A-1050C; the traffic is routed to the service provider data center, and at the data center is routed, via a network substrate, to the local IP address 1016 of the virtualized computing resource instance 1012 currently mapped to the destination public IP address 1014. Similarly, response traffic from the virtualized computing resource instance 1012 may be routed via the network substrate back onto the intermediate network 1040 to the source entity 1020.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 1000; a customer may then assign their allocated public IP addresses to particular resource instances allocated to the customer. These public IP addresses may be referred to as customer public IP addresses, or simply customer IP addresses. Instead of being assigned by the provider network 1000 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 11:
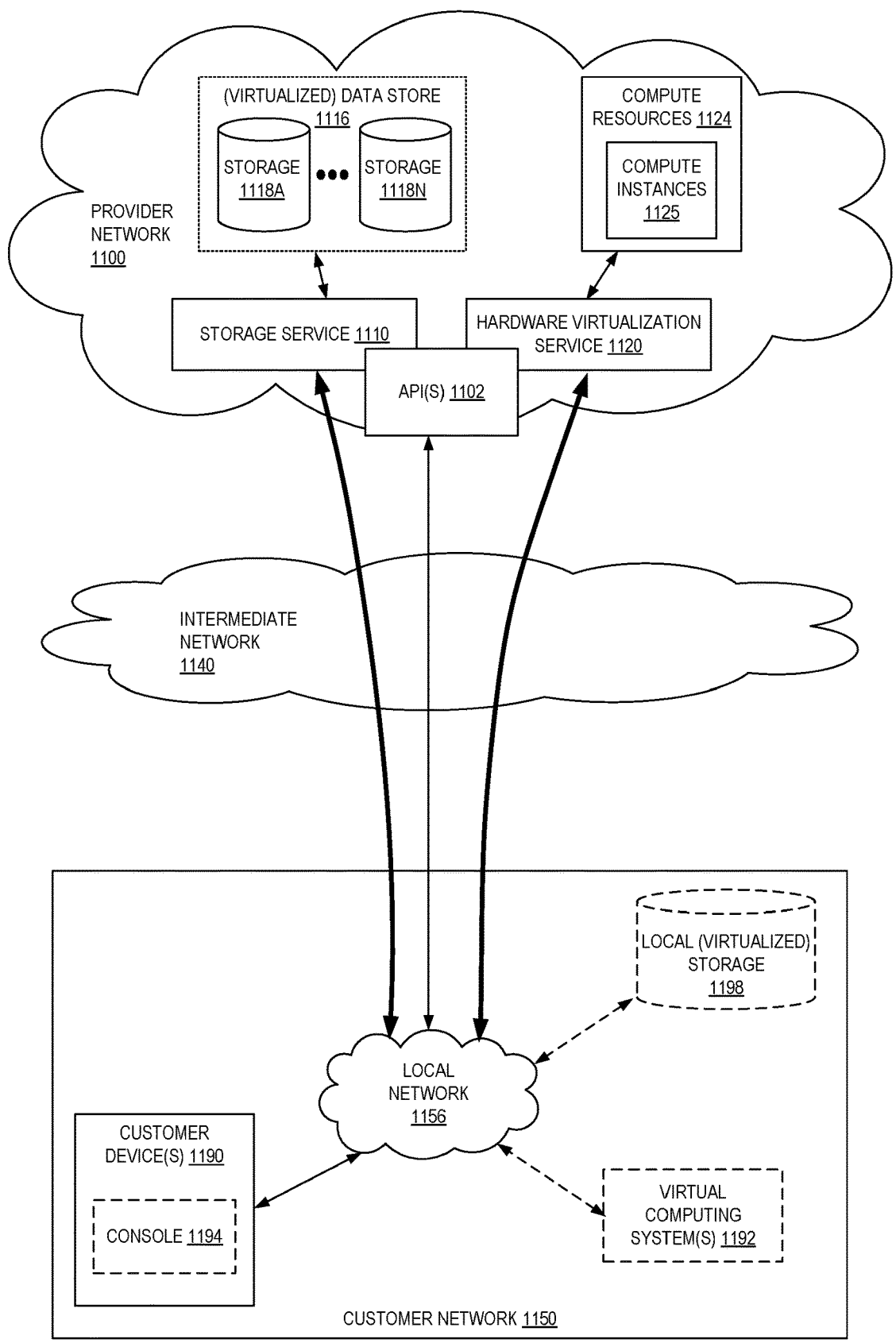
FIG. 11 is a block diagram of an example provider network that provides a storage service and a hardware virtualization service to customers according to some embodiments.

FIG. 11 is a block diagram of an example provider network environment that provides a storage service and a hardware virtualization service to customers, according to some embodiments. A hardware virtualization service 1120 provides multiple compute resources 1124 (e.g., compute instances 1125, such as VMs) to customers. The compute resources 1124 may, for example, be rented or leased to customers of a provider network 1100 (e.g., to a customer that implements a customer network 1150). Each computation resource 1124 may be provided with one or more local IP addresses. The provider network 1100 may be configured to route packets from the local IP addresses of the compute resources 1124 to public Internet destinations, and from public Internet sources to the local IP addresses of the compute resources 1124.

The provider network 1100 may provide the customer network 1150, for example coupled to an intermediate network 1140 via a local network 1156, the ability to implement virtual computing systems 1192 via the hardware virtualization service 1120 coupled to the intermediate network 1140 and to the provider network 1100. In some embodiments, the hardware virtualization service 1120 may provide one or more APIs 1102, for example a web services interface, via which the customer network 1150 may access functionality provided by the hardware virtualization service 1120, for example via a console 1194 (e.g., a web-based application, standalone application, mobile application, etc.) of a customer device 1190. In some embodiments, at the provider network 1100, each virtual computing system 1192 at the customer network 1150 may correspond to a computation resource 1124 that is leased, rented, or otherwise provided to the customer network 1150.

From an instance of the virtual computing system(s) 1192 and/or another customer device 1190 (e.g., via console 1194), the customer may access the functionality of a storage service 1110, for example via the one or more APIs 1102, to access data from and store data to storage resources 1118A-1118N of a virtual data store 1116 (e.g., a folder or "bucket," a virtualized volume, a database, etc.) provided by the provider network 1100. In some embodiments, a virtualized data store gateway (not shown) may be provided at the customer network 1150 that may locally cache at least some data, for example frequently accessed or critical data, and that may communicate with the storage service 1110 via one or more communications channels to upload new or modified data from a local cache so that the primary store of data (the virtualized data store 1116) is maintained. In some embodiments, a user, via the virtual computing system 1192 and/or another customer device 1190, may mount and access virtual data store 1116 volumes via the storage service 1110 acting as a storage virtualization service, and these volumes may appear to the user as local (virtualized) storage 1198.

While not shown in FIG. 11, the virtualization service(s) may also be accessed from resource instances within the provider network 1100 via the API(s) 1102. For example, a customer, appliance service provider, or other entity may access a virtualization service from within a respective virtual network on the provider network 1100 via the API(s) 1102 to request allocation of one or more resource instances within the virtual network or within another virtual network.

Illustrative Systems

Figure 12:
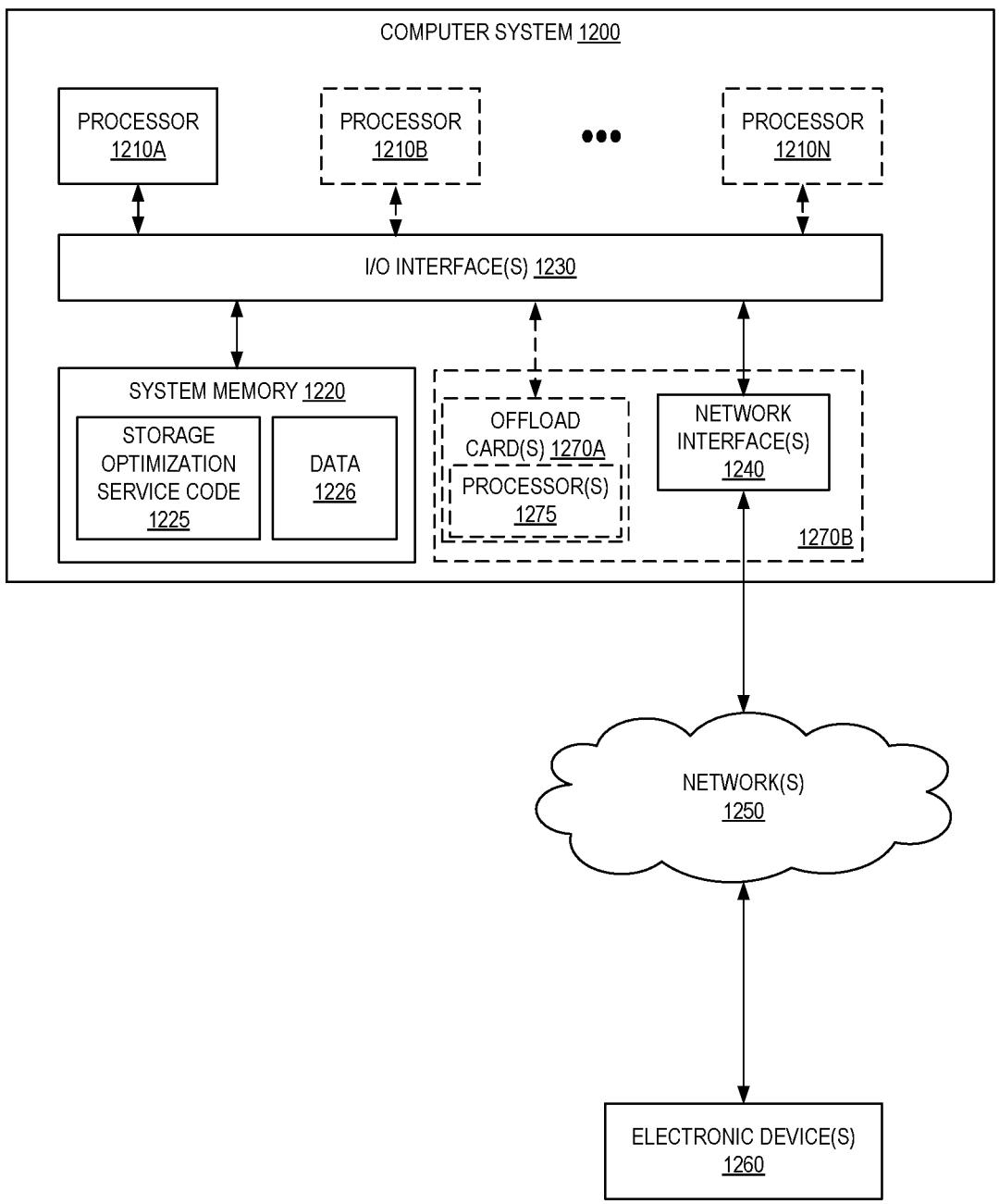
FIG. 12 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 1200 illustrated in FIG. 12. In the illustrated embodiment, computer system 1200 includes one or more processors 1210 coupled to a system memory 1220 via an input/output (I/O) interface 1230. Computer system 1200 further includes a network interface 1240 coupled to I/O interface 1230. While FIG. 12 shows computer system 1200 as a single computing device, in various embodiments a computer system 1200 may include one computing device or any number of computing devices configured to work together as a single computer system 1200.

In various embodiments, computer system 1200 may be a uniprocessor system including one processor 1210, or a multiprocessor system including several processors 1210 (e.g., two, four, eight, or another suitable number). Processors 1210 may be any suitable processors capable of executing instructions. For example, in various embodiments, processors 1210 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1210 may commonly, but not necessarily, implement the same ISA.

System memory 1220 may store instructions and data accessible by processor(s) 1210. In various embodiments, system memory 1220 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1220 as SOS code 1225 (e.g., executable to implement, in whole or in part, the SOS 120) and data 1226.

In one embodiment, I/O interface 1230 may be configured to coordinate I/O traffic between processor 1210, system memory 1220, and any peripheral devices in the device, including network interface 1240 or other peripheral interfaces. In some embodiments, I/O interface 1230 may perform any necessary protocol, timing or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. Also, in some embodiments some or all of the functionality of I/O interface 1230, such as an interface to system memory 1220, may be incorporated directly into processor 1210.

Network interface 1240 may be configured to allow data to be exchanged between computer system 1200 and other devices 1260 attached to a network or networks 1250, such as other computer systems or devices as illustrated in FIG. 1, for example. In various embodiments, network interface 1240 may support communication via any suitable wired or wireless general data networks, such as types of Ethernet network, for example. Additionally, network interface 1240 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1200 includes one or more offload cards 1270A or 1270B (including one or more processors 1275, and possibly including the one or more network interfaces 1240) that are connected using an I/O interface 1230 (e.g., a bus implementing a version of the Peripheral Component Interconnect—Express (PCI-E) standard, or another interconnect such as a QuickPath interconnect (QPI) or UltraPath interconnect (UPI)). For example, in some embodiments the computer system 1200 may act as a host electronic device (e.g., operating as part of a hardware virtualization service) that hosts compute resources such as compute instances, and the one or more offload cards 1270A or 1270B execute a virtualization manager that can manage compute instances that execute on the host electronic device. As an example, in some embodiments the offload card(s) 1270A or 1270B can perform compute instance management operations such as pausing and/or un-pausing compute instances, launching and/or terminating compute instances, performing memory transfer/copying operations, etc. These management operations may, in some embodiments, be performed by the offload card(s) 1270A or 1270B in coordination with a hypervisor (e.g., upon a request from a hypervisor) that is executed by the other processors 1210A-1210N of the computer system 1200. However, in some embodiments the virtualization manager implemented by the offload card(s) 1270A or 1270B can accommodate requests from other entities (e.g., from compute instances themselves), and may not coordinate with (or service) any separate hypervisor.

In some embodiments, system memory 1220 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1200 via I/O interface 1230. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1200 as system memory 1220 or another type of memory. Further, a computer-accessible medium may include transmission media or signals such as electrical, electromagnetic, or digital signals, conveyed via a communication medium such as a network and/or a wireless link, such as may be implemented via network interface 1240.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 1118A-1118N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given embodiment requires at least one of A, at least one of B, and at least one of C to each be present.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
receiving, at a storage optimization service of a provider network, a message indicating a request to monitor a table for storage optimization, wherein the table is a logical table implemented at least in part using a table index identifying data objects storing records of the table;
receiving, at the storage optimization service from another service of the provider network, one or more messages indicating that a first set of data objects associated with the table have been added or removed, wherein the first set of data objects were or are stored by an object storage service of the provider network;
determining that the table meets one or more optimization criteria;
inserting an entry for the table into a queue of an optimization scheduler of the storage optimization service;
generating a priority score for the table based on determining a benefit that would result from optimizing the table;
updating a priority value of the entry for the table within the queue based on the priority score for the table, wherein the updating is performed asynchronously to the inserting of the entry for the table into the queue;
selecting the entry for the table from the queue based on the priority value of the entry for the table;
obtaining, from the object storage service, a second set of data objects referenced by the table;
performing an optimization involving the second set of data objects, comprising generating a third set of data objects based on the second set of data objects;
transmitting the third set of data objects to be stored by the object storage service; and
causing the table index for the table to be modified, via an atomic transactional update, to reference the third set of data objects.

2. The computer-implemented method of claim 1, further comprising:
identifying a type of service or application that has accessed the table;
identifying a recency or frequency of accesses to the table; and
identifying a complexity value of the optimization, wherein generating the priority score is based at least in part on the identified type, the identified recency or frequency, and the identified complexity value.

3. The computer-implemented method of claim 1, wherein the optimization comprises one of:
   sorting records stored by the second set of data objects according to values of a field present in the records;
   consolidating the second set of data objects into the third set of data objects, the third set of data objects having fewer data objects than the second set of data objects but still storing the same records;
   changing a format of the second set of data objects from a row-oriented format to a column-oriented format, resulting in the third set of data objects that are of the column-oriented format; or
   compressing or decompressing the second set of data objects, resulting in the third set of data objects.

4. A computer-implemented method comprising:
   receiving, at a storage optimization service of a provider network from another service of the provider network, one or more messages indicating that a first set of data objects associated with a table have been added or removed, wherein the first set of data objects were or are stored by an object storage service of the provider network;
   determining that the table meets one or more optimization criteria;
   inserting an entry for the table into a queue of an optimization scheduler of the storage optimization service;
   generating a priority score for the table based on determining a benefit that would result from optimizing the table;
   updating a priority value of the entry for the table within the queue based on the priority score for the table;
   selecting the entry for the table from the queue based on the priority value of the entry for the table;
   performing an optimization involving a second set of data objects referenced by the table, comprising generating a third set of data objects based on the second set of data objects;
   transmitting the third set of data objects to be stored; and
   causing a table index for the table to be modified to reference the third set of data objects.

5. The computer-implemented method of claim 4, wherein the generating of the priority score and the updating of the priority value of the entry for the table is performed asynchronously from the inserting of the entry for the table into the queue.

6. The computer-implemented method of claim 4, further comprising:
   identifying a type of service or application that has accessed the table, wherein generating the priority score is based at least in part on the identified type.

7. The computer-implemented method of claim 4, further comprising:
   identifying a recency or frequency of accesses to the table, wherein generating the priority score is based at least in part on the identified recency or frequency.

8. The computer-implemented method of claim 4, further comprising:
   identifying a complexity value of the optimization, wherein generating the priority score is based at least in part on the complexity value.

9. The computer-implemented method of claim 4, further comprising:
   assigning, by a scheduler, optimization tasks to a fleet of one or more optimizers executed by one or more computing devices based at least in part on respective priority values of entries of the queue, including the entry for the table.

10. The computer-implemented method of claim 9, wherein the assigning of optimization tasks is further based on usage data of tables within the provider network, wherein the usage data comprises actual usage or predicted usage.

11. The computer-implemented method of claim 4, wherein the optimization comprises one of:
    sorting records stored by the second set of data objects according to values of a field present in the records;
    consolidating the second set of data objects into the third set of data objects, the third set of data objects having fewer data objects than the second set of data objects but still storing the same records;
    changing a format of the second set of data objects from a row-oriented format to a column-oriented format, resulting in the third set of data objects that are of the column-oriented format; or
    compressing or decompressing the second set of data objects, resulting in the third set of data objects.

12. The computer-implemented method of claim 4, further comprising:
    identifying a storage location, within the provider network, based on a geographic location associated with prior use of the table or a user account that owns or manages the table, wherein transmitting the third set of data objects to be stored by the object storage service includes sending an identifier of the storage location, to the object storage service, to cause the third set of data objects to be stored at the storage location.

13. The computer-implemented method of claim 4, wherein further comprising:
    determining, based on previous usage data associated with the table, at least two classes of data records of the table, wherein generating the third set of data objects based on the second set of data objects includes:
       storing a first portion of records from the second set of data objects that belong to a first class in a first one or more of the third set of data objects,
       storing a second portion of records from the second set of data objects into a second one or more of the third set of data objects, and
    wherein transmitting the third set of data objects to be stored by the object storage service includes:
       sending a first storage tier identifier to the object storage service to cause the first one or more of the third set of data objects to be stored using a first access tier; and
       sending a second storage tier identifier to the object storage service to cause the second one or more of the third set of data objects to be stored using a second access tier, wherein the first access tier and the second access tier provide different latency or throughput or reliability characteristics.

14. A system comprising:
    a first one or more electronic devices to implement an object storage service in a multi-tenant provider network to store data objects; and
    a second one or more electronic devices to implement a storage optimization service in the multi-tenant provider network, the storage optimization service including instructions that upon execution cause the storage optimization service to:
       receive one or more messages indicating that a first set of data objects associated with a table have been added or removed, wherein the first set of data objects were or are stored by the object storage service;

determine that the table meets one or more optimization criteria;

insert an entry for the table into a queue of an optimization scheduler of the storage optimization service;

generate a priority score for the table based on determining a benefit that would result from optimizing the table;

update a priority value of the entry for the table within the queue based on the priority score for the table;

select the entry for the table from the queue based on the priority value of the entry for the table;

perform an optimization involving a second set of data objects referenced by the table, comprising generating a third set of data objects based on the second set of data objects;

transmit the third set of data objects to be stored by the object storage service; and cause a table index for the table to be modified to reference the third set of data objects.

15. The system of claim 14, wherein the generation of the priority score and the update of the priority vale is performed asynchronously from the inserting of the entry into the queue.

16. The system of claim 14, wherein the storage optimization service further includes instructions that upon execution cause the storage optimization service to:

identify a type of service or application that has accessed the table, wherein generation of the priority score is based at least in part on the identified type.

17. The system of claim 14, wherein the storage optimization service further includes instructions that upon execution cause the storage optimization service to:

identify a recency or frequency of accesses to the table, wherein generation of the priority score is based at least in part on the identified recency or frequency.

18. The system of claim 14, wherein the storage optimization service further includes instructions that upon execution cause the storage optimization service to:

identify a complexity value of the optimization, wherein generation of the priority score is based at least in part on the complexity value.

19. The system of claim 14, wherein the storage optimization service further includes instructions that upon execution cause the storage optimization service to:

assign, by a scheduler, optimization tasks to a fleet of one or more optimizers executed by one or more computing devices based at least in part on respective priority values of entries of the queue, including the entry for the table.

20. The system of claim 14, wherein the optimization comprises one of:

sorting records stored by the second set of data objects according to values of a field present in the records;

consolidating the second set of data objects into the third set of data objects, the third set of data objects having fewer data objects than the second set of data objects but still storing the same records;

changing a format of the second set of data objects from a row-oriented format to a column-oriented format, resulting in the third set of data objects that are of the column-oriented format; or compressing or decompressing the second set of data objects, resulting in the third set of data objects.

* * * * *